(12) United States Patent
Lõssov et al.

(10) Patent No.: US 9,242,810 B2
(45) Date of Patent: Jan. 26, 2016

(54) SELF-SERVICE PARCEL TERMINAL

(71) Applicant: Cleveron Ltd, Viljandi (EE)

(72) Inventors: Remi Lõssov, Viljandi (EE); Mart Roht, Viljandi (EE); Lauri Hirvesaar, Tallinn (EE)

(73) Assignee: Cleveron Ltd, Viljandi (EE)

( * ) Notice: Subject to any disclaimer, the term of this patent is extended or adjusted under 35 U.S.C. 154(b) by 0 days.

(21) Appl. No.: 14/562,882

(22) Filed: Dec. 8, 2014

(65) Prior Publication Data

US 2015/0158679 A1    Jun. 11, 2015

(30) Foreign Application Priority Data

Dec. 9, 2013  (EP) ..................................... 13196165

(51) Int. Cl.
| | |
|---|---|
| B65G 63/00 | (2006.01) |
| B65G 63/06 | (2006.01) |
| B65G 1/04 | (2006.01) |
| B65G 1/06 | (2006.01) |
| G06Q 10/08 | (2012.01) |

(52) U.S. Cl.
CPC ............... *B65G 63/004* (2013.01); *B65G 1/04* (2013.01); *B65G 1/06* (2013.01); *B65G 63/065* (2013.01); *G06Q 10/08* (2013.01); *B65G 2201/025* (2013.01); *B65G 2203/0233* (2013.01); *B65G 2203/042* (2013.01)

(58) Field of Classification Search
CPC ............. A47F 1/00; A47F 1/10; A47F 10/02; G07D 13/00
USPC ....................... 186/57, 58; 235/381, 383, 385; 221/212, 282; 414/591, 606, 751.1; 312/306, 319.8
See application file for complete search history.

(56) References Cited

U.S. PATENT DOCUMENTS

| | | | | |
|---|---|---|---|---|
| 4,858,743 | A | * | 8/1989 | Paraskevakos et al. ....... 194/205 |
| 4,995,498 | A | * | 2/1991 | Menke .......................... 194/205 |
| 6,694,217 | B2 | | 2/2004 | Bloom |
| 8,145,351 | B2 | * | 3/2012 | Schininger et al. ........... 700/237 |
| 2008/0122615 | A1 | | 5/2008 | Shoenfeld |
| 2010/0307989 | A1 | | 12/2010 | Hanel |

FOREIGN PATENT DOCUMENTS

| | | |
|---|---|---|
| EP | 1061013 A1 | 12/2000 |
| EP | 1382273 A1 | 1/2004 |
| EP | 1462392 A2 | 9/2004 |
| EP | 1473254 B1 | 5/2008 |

OTHER PUBLICATIONS

European search report dated May 23, 2014 for EP application 13196165, (6 pages).

* cited by examiner

*Primary Examiner* — Mark Beauchaine
(74) *Attorney, Agent, or Firm* — Berggren Inc.

(57) ABSTRACT

Self-service parcel terminal for storing parcels of different sizes high up in the terminal comprises means for loading postal parcels, loading parcels of varying sizes to the door, measuring and weighing parcels, inserting parcels, storing and delivering parcels. The self-service parcel terminal is also suitable for using as a vending machine, mailbox, storage locker, for delivering goods from e-stores, etc. Gripping mechanism and lift system are used for moving parcels in the terminal, which allows to move parcels in groups or as single items between the shelves and the slot for inserting/delivering parcels.

10 Claims, 20 Drawing Sheets

SELF-SERVICE PARCEL TERMINAL

PRIORITY

This application claims priority of European application EP13196165 which was filed on Dec. 9, 2013, and the contents of which are fully incorporated herein by reference.

FIELD OF INVENTION

The present invention relates to the field of self-service parcel terminals, more specifically to the field of delivery, sending and receiving parcels, packages, mail and other postal objects.

BACKGROUND OF THE INVENTION

It is well-known, that there is a variety of different automated machines and terminals for postal objects, such as widely known automated machines for postal objects that have a separate locker for each parcel. Courier or parcel delivery person inserts the postal object to the locker of suitable size and enters the receiver. If the same locker has been addressed as the point of delivery for the recipient, the recipient is sent a message as an SMS or the like, and in order to pick up the parcel the recipient keys in the relevant code at the user interface upon which the door of the locker opens for the receiver to pick up their parcel. If a parcel terminal located elsewhere has been assigned as the pick-up place of the parcel, another courier comes to pick up the parcels, enters access code at the user interface or identifies their right to access in some other way, picks up parcels from each locker and takes them to the next automated machine where they insert each parcel into a separate locker after having gained access there.

That kind of generally known solution has several drawbacks. Inserting the parcels by the courier and picking the parcels up by another courier or parcel recipient is slow because each locker must be opened and closed separately. When the parcels have been transferred from one courier to another and parcels for different recipients have been inserted together into one bigger locker there is a danger that a user may have access to unrelated parcels and upon picking parcels up or inserting them the user may mix the parcels up and one or more parcels may end up being delivered to the wrong person. In the case of different parcel senders and recipients, and also for security reasons separate lockers are preferred for each parcel which means that parcel terminals are too large in order to have enough capacity for a sufficient number of lockers. For example, using the service of parcel terminals is expensive at shopping and entertainment centers, sports facilities, airports, etc. because of expensive rented areas available there. However, it is not possible to build parcel terminals higher either because in such a case people of smaller height, or disabled people in wheelchairs would not be able to get their parcel from higher lockers, or some of the parcels are too heavy to be fitted into higher lockers, or to be picked up from these lockers. Another problem is, that since parcel terminals make maximum use of space, some of the lockers are, again, too low and that is what makes it complicated or even impossible for some users to pick up their parcels. Although well-known parcel terminals have lockers of different sizes, the number of lockers of less common sizes is smaller and so it may happen that upon arrival of a parcel there is no locker of that size available at the parcel terminal. That can easily happen due to the fact that during different seasons or at different locations parcels of varying sizes are posted. The identification of the user and granting access is uncomfortable in the case of several widely known solutions, or even insecure because the user must have a special access code, magnetic card or some other solution to be carried along with them in order to identify themselves and gain access. In the case when this identification tool is lost or stolen, the courier or the recipient gains no access to the parcel terminal or parcels and inserting as well as picking up parcels has been hampered. Similarly, in the case of the ID or access solution reaching into the hands of unrelated persons the recipient may not receive their parcel at all.

Therefore, widely known parcel terminals are insecure, with unbalance or little capacity, take up too much space, uncomfortable for users and inserting, storing and delivering parcels is too slow.

The closest solution to the present invention would be U.S. Pat. No. 6,694,217 "Automated system for efficient article storage and self-service retrieval", which describes a vertical storage locker and is also suitable for sending and receiving parcels. The described solution contains rectangular boxes that have been fixed between two vertical pulling belts creating a vertical carousel-like mechanism. Each box has been divided into drawers. In order to insert the package, the carousel spins until the box with empty drawers has been guided in front of the slot of the storage compartment doors, whereas each drawer has been assigned their own door. Upon retrieving the parcel, the carousel spins in the similar fashion until the drawer with the desired parcel has been guided to its relevant door. The drawback of this solution is their complicated and clumsy structure, and the long waiting time, until the suitable drawer has reached the suitable door, while both inserting and retrieving parcels. As the sending and picking up parcels takes place at different times, then the distribution of parcels in the boxes is uneven, and upon inserting several parcels—when they have to be placed into different boxes—the user must wait until the next box with an empty drawer has reached its door, and again open the suitable door whereas this must be done after inserting each parcel and closing the door. Another issue with this solution is that due to the carousel mechanism and each drawer having their assigned doors, it only enables inserting parcels or postal objects of very limited sizes.

From prior art there are different other known vertical carousel and lift-type solutions that are used to store or warehouse building materials, manufactured and other goods. Carousel solutions work there similarly to the one described in U.S. Pat. No. 6,694,217. In the case of the so-called lift-type solutions there is a drawer with a board, for placing goods on it or taking them from it, facing the hatch for inserting and retrieving goods. Above the drawer there is a shelf facing another shelf parallel to it, and a lift moves up and down between these two shelves, taking the board or tray with goods placed on it from the hatch, and delivering it up to the suitable shelf. To order the goods to the hatch, the lift is moved to the relevant shelf from which the board with the desired goods is pulled to the platform of the lift. Such solutions have been described, for example, in U.S. Pat. No. 6,694,217 according to which the platform of the lift moves thanks to the lifting mechanism of chains fastened to its ends. Or like it is described in the European patent documents EP1473254B1 and EP1462392A2, where, similarly to the moving platform between two shelves, the lifting mechanism of the platform comprises guide rails located at both ends of the platform between which the platform moves. The drawback of such solutions is that in order to warehouse different goods, the platform needs to be moved up and down several times because the platform only allows transporting one board at a time. As the hatch or door to the keeping area of the goods opens to its full capacity in such solutions, that only allows placing goods of the same type or meant for one and the same customer together on it. Such solutions are thus unsuitable for applying to self-service parcel terminals because they do not guarantee sufficient security that the right parcels reach their right recipients; transporting the goods to and from their shelves is complicated and time-consuming.

SUMMARY OF THE INVENTION

The aim of the present invention is to offer a secure, simple, fast, reliable and high capacity self-service postal parcel terminal that would take up little floor space and would come without the drawbacks mentioned above. More precisely, the purpose of present invention is to fasten the loading, storing and delivering parcels, and to make the storage of parcels easier, increase the capacity of the terminal, guarantee the security of parcels and that each person receives their specific parcel, as well as to increase the user-friendliness of the terminal.

Differently from the well-known solutions, the present self-service postal parcel terminal enables fitting more parcels to the same floor space than the presently known solutions. Loading and retrieving parcels is several times faster, and due to the height of the terminal, it uses significantly less floor space.

The parcel terminal according to the present invention comprises the module for loading and delivering parcels, the module for loading parcels of different sizes to the door, module for measuring and weighing parcels, the module for loading, storing and delivering parcels.

The self-service parcel terminal according to the present invention has such a structure that differently from earlier solutions, the parcels are stored in parcel containers located on the shelves inside the terminal, and only one door is used in order to insert/load and retrieve parcels. Upon loading or retrieving several parcels it is thus not necessary to move back and forth between different doors. Automated parcel transportation mechanism guides the parcel container with one or several compartments to the loading and delivery slot. The loading and delivery slot door system opens to load or deliver parcels either fully, so that all the compartments of the parcel container are open and accessible, or only so much that the desired compartment for inserting or delivering the parcel is open.

The door system is fully open to the full extent of the parcel container in order to retrieve or insert several parcels, and for further speeding up loading, storing and parcel delivery time the courier or other users are given, for example, light signals as to which parcel must be placed into which compartment, and which compartment the parcel must be retrieved from. Using light signals makes the courier's work faster, customers receive their parcel quicker, or can insert their parcel faster into the machine, and parcel delivery time becomes quicker.

Door opening system comprises two door panels moving horizontally towards each other, or away from each other; and one vertically moving door panel.

In order to measure the parcels, the parcel is placed between open door panels and the relevant command is selected from the user menu; automated system moves the door panels slowly towards the parcel. Sensors then measure the distance between the door panels and the width and height measures of the parcel are calculated. After having calculated the measures, a suitable parcel container is sent and parcels are placed to the compartments that best fit the parcel measures. Parcels are preferably placed into those size-wise fitting compartments of the containers that are closest to the door slot in order to keep the time for placing parcels into parcel containers to the optimum.

Upon delivering the parcel, the door panels are guided automatically and simultaneously with the lift, and door panels are opened at the right place while bringing the parcel container to the door according to this which compartment of the parcel container contains the parcel.

In the case when a parcel container contains parcels addressed to different recipients, the retrieval of the right parcel by the right person is guaranteed so that door panels are moved by the controller both horizontally and vertically in the way that the door panels open only in front of this compartment of the parcel container where the particular parcel for that recipient is located. Delivering parcels this way also guarantees that upon retrieving or loading a parcel the recipient or courier has no access to unrelated parcels.

It is known about the solutions in use thus far that some people, e.g. the disabled in wheelchairs, shorter or older people cannot retrieve their parcels easily at the terminal because some parcels are too high up, others too low which creates possibilities for stealing parcels, or that a parcel may end up in wrong hands. In the present terminal the loading and delivery slot has been added to a suitable set height in order to ensure security. Lift system always brings the parcel to be delivered to the same fixed level which enables the user—also while in wheelchair—easily retrieve or send the parcel at the machine without asking a stranger for help.

In order to identify the courier or maintenance person for the terminal, a facial recognition camera has been added to the terminal in an alternative embodiment of the invention which, differently from the already known solutions enable card—as well as code-free identification, thus again making using the terminal more secure, simpler and faster.

Upon loading parcels bearing no marking specifying the recipient or other data, and for the terminal to accept such parcels, the user identifies the unmarked parcel before inserting it to the loading and delivery slot. When the courier retrieves the parcel, a bar code, for example is issued first—a sticker with for example an RFID, NFC or other marking. Courier sticks it to the parcel being retrieved. Unmarked parcels are provided, upon their retrieval from the terminal, with a marking that is necessary for further transportation of the parcel.

Parcels vary in size depending on the season or their location in the terminal. In order to increase the maximum capacity of the terminal, the shelving system has been constructed adaptable so that depending on the need (e.g. season, location, target user group, etc.) it would accommodate maximum number of replaceable parcel containers of suitable measures, which in turn would accommodate maximum number of parcels in the terminal.

Lifting mechanism comprises a motor and a counter weight. Applying a motor and a counter weight together allows using a more compact motor of smaller power capacity while at the same time transporting heavier parcels and parcel containers higher.

Instead of the parcel or parcel container moving systems in the already known solutions, a gripping mechanism has been used in the present invention.

The gripping mechanism of parcel containers comprises a loader and a magnetic mechanism. In an alternative embodiment the gripping mechanism comprises the chain system mechanism.

The lifting and gripping mechanisms allow maximum use of the terminal inside area for parcel containers meant for storing parcels. That kind of gripping mechanism also enables transportation of parcel containers of varying sizes to the door slot.

Automatic weighing of parcels is done, for example, by the lifting mechanism and relevant sensors, the parcel weight information obtained by automated weighing is added to the parcel information.

Different alternative embodiments of the invention comprising a variety of payment systems (e.g. payment by card, in cash, via mobile phone; NFC/QR etc. payments based on contactless technology, biometric payment); various means to identify the parcel, recipient, parcel arrival; means to monitor the parcel rout, send the parcel, etc.; devices to measure, weigh, evaluate, calculate the cost of, mark, stamp the parcel or other analogous solutions that are based on added sensors, devices, and updating the computer with the relevant software module.

In addition to the main purpose of the invention, the present self-service parcel terminal can also be used as, for example, a vending machine, mail box, storage locker, for delivering goods from e-shops, or similar solutions.

The self-service terminal according to the present invention comprises a multi-load system for couriers. When choosing the multi-load program, the self-service terminal opens up all slots at the same time. Couriers insert similar parcels into separate slots in a matter of seconds without having to move around. The solution is easy to use. The courier only has to scan the barcode of each parcel and the light in front of the right slot shows where to put the parcel. The multi-load system is fool proof and saves time and energy.

The customer receives an SMS notification with a pin-code to pick-up the parcel from the self-service terminal. After inserting the pin-code, the terminal brings the parcel to the sliding door, which is located at a convenient height for all customers. The door slides down and only the right slot with the right parcel is opened up. The self-service terminal allows faster retrieval of the parcel than the known parcel terminals. The customer collects the parcel quickly and without any effort.

BRIEF DESCRIPTION OF THE DRAWINGS

The present invention is explained more precisely with references to figures added, where the drawing

DETAILED DESCRIPTION OF THE INVENTION

The self-service parcel terminal according to the present invention comprises a body 0100, frame 0200, lift module 0300, door system 0400, payment module 0500, computer 0600, motors 0700 (preferably, for example, AC servomotors, in an alternative embodiment asynchronous motor, step-by-step motor, DC motor, DC carbon brush motor), drive module 0800, electricity module 0900, parcel containers 1000, sensor, controllers, converters, connection details for electronic components (e.g. cables, details for wireless connection).

Figure 1:
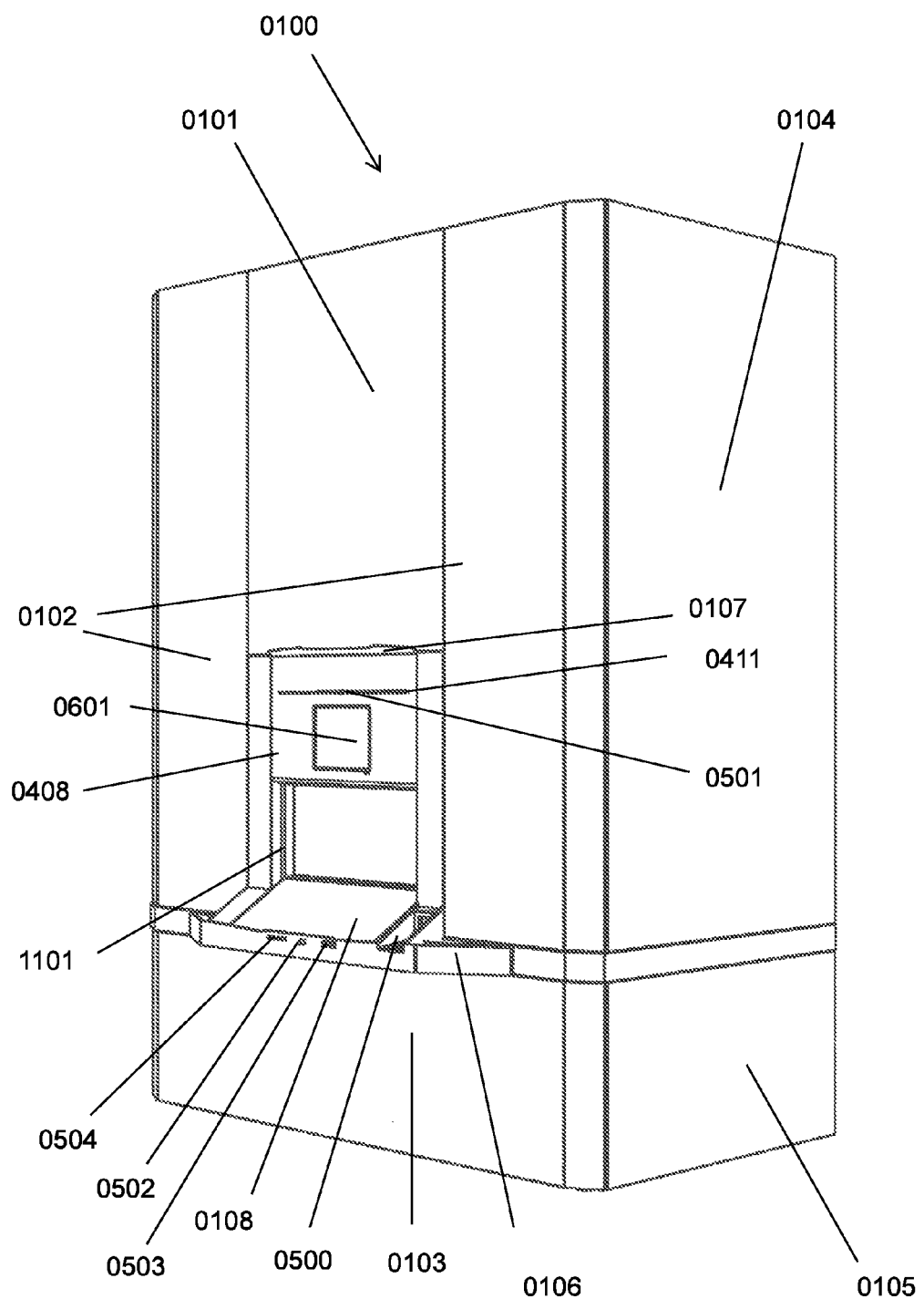
FIG. 1 shows a perspective view of the preferable embodiment of the self-service parcel terminal according to the present invention.

The following provides a more detailed description of the preferred embodiment of the invention. The body 0100 shown in the drawing FIG. 1 comprises at least one removable first upper covering panel 0101, on middle 0102 and lower covering panel 0103, two upper side covering panels 0104 and two lower side covering panels 0105 and a rear covering panel 0109. The covering panels of the front of the body are placed so that slots have been created for the door module 0400, payment module 0500, computer module 0600, screen 0601 and which have been added a belt 0106, if necessary sheltering roof 0107, device box 0108. The belt 0106 has been fastened to the shelves. Covering plates and the device box or payment module 0500 are attached to the belt 0106. One of the embodiments of the invention has a receipt printer 0504, a scanner 0502 and sticker a tag printer 0503 added, for example, inside the belt 0106.

Figure 2:
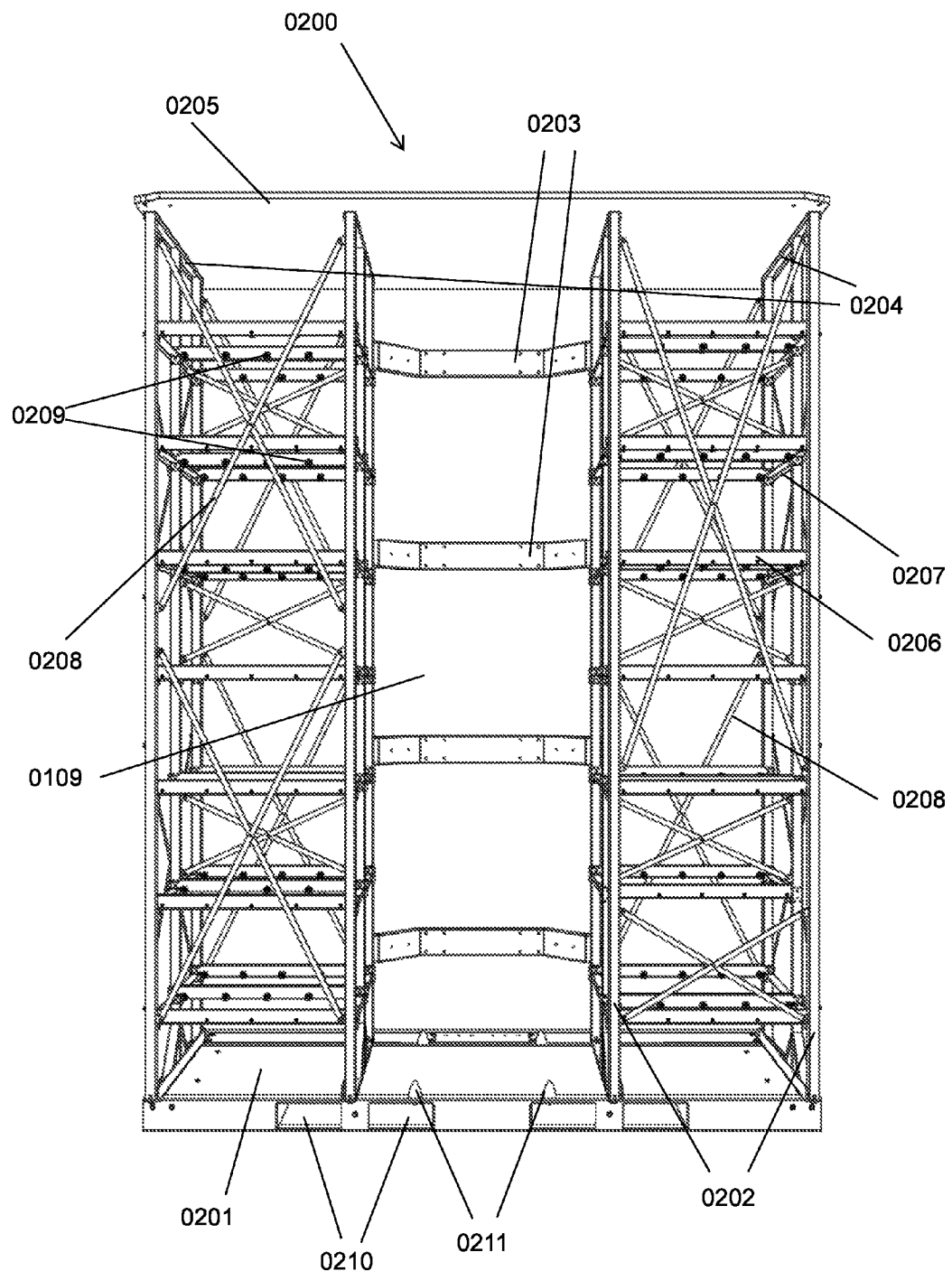
FIG. 2 shows the front view of the shelving system of the terminal in FIG. 1.

The frame 0200 shown in the drawing FIG. 2 comprises the base frame 0201, at least eight support poles 0202 vertically fastened to the frame, at least two brackets 0203 fastened to the rear middle support poles 0202, support pole 0202 connecting buses 0204 fastened to the upper ends of the support poles and a roof 0205 attached to the connecting buses 0204, support rods 0206 and 0207 in order to connect the support poles 0202 with each other and cross poles 0208.

The support poles 0202 have been fastened to the base frame 0201 in the way that one support pole 0202 has been attached to each corner of the upper side of the base frame 0201 and two support poles 0202 have been attached to both longer sides of the upper side of the base frame 0201. Additional support poles 0201 have been added between the support poles 0201 located either in the corners of the longer or shorter edge of the upper side of the base frame 0201 if necessary.

The support poles 0202, connecting buses 0204, support rods 0206 and 0207 and cross poles 0208 as well as rollers 0209 fastened to the support rods 0206 comprise a shelving system.

The sides of the base frame 0201 comprising slots 0210 and the upper side comprises absorbers 0211. The slots 0210 are for transporting the self-service parcel terminal according to the present invention. The slots 0210 are covered with covering panels 0103 and 0105 in the working position of the fully assembled terminal. The slots 0210 have been created to the front, behind and sides as well. In the case when there occurs a need to, for example, transport, move or lift the terminal, it is not necessary to fully unload it and disassemble, it is enough to remove the covering panel 0103 or 0105, and that makes the terminal easily moveable, liftable or transportable by a fork-lift truck from the front, behind or sides. Absorbers 0211 have been added to ensure security while guiding the positioner 0307 of the lift module 0300 to its lower position, or when the positioner 0307, should a malfunctioning occur, falls down.

Cross poles 0208 are meant for both strengthening the frame 0200 and ensuring security so that the parcel containers 1000 would not move out of the shelves. Roller frame comprises a bent support at the end of the path in order to limit the movement of parcel containers. Different embodiments of the terminal include parcel containers 1000 with locking 1001 and without, wider and narrower. Parcel container 1000 has been added a locking mechanism to prevent accidental movement of the parcel container on the shelf. Wider parcel containers 1000 comprises double pair of sliders. Side sliders of those are used while placing the parcel container onto the shelf and while pulling it out, and middle sliders are used for pulling onto the loader 0308 or for pushing from the loader 0308 to the shelf.

Figure 3:
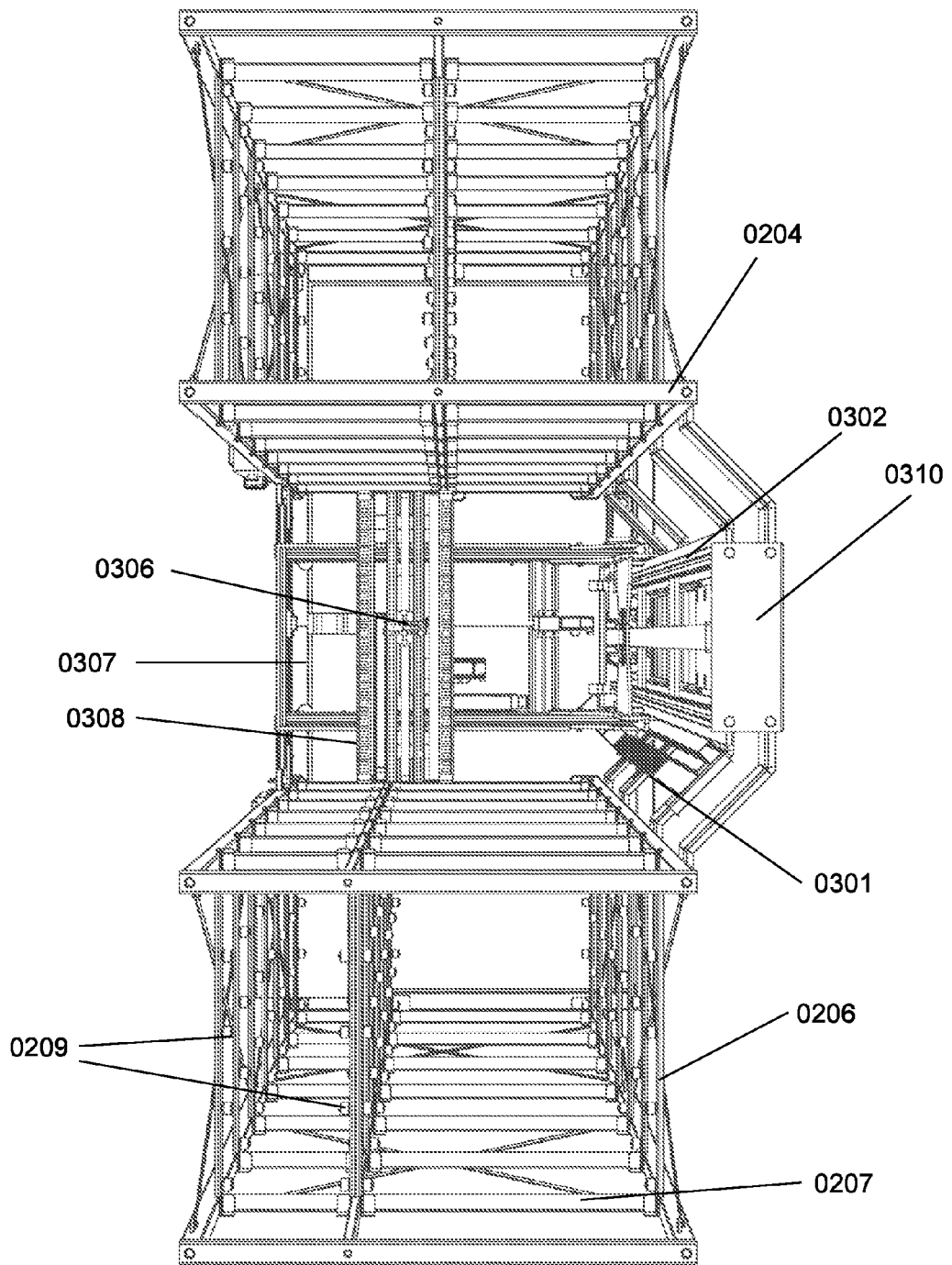
FIG. 3 shows the view from above, without the roof, of the shelving system in drawing FIG. 2.

Drawing FIG. 3 shows the view of the shelving system and frame 0200 without the roof 0205 from above, with showing also the view from above of the main boom 0302, carriage 0305, positioner 0307, loader 0308 and the magnetic mechanism 0306.

Figure 4:
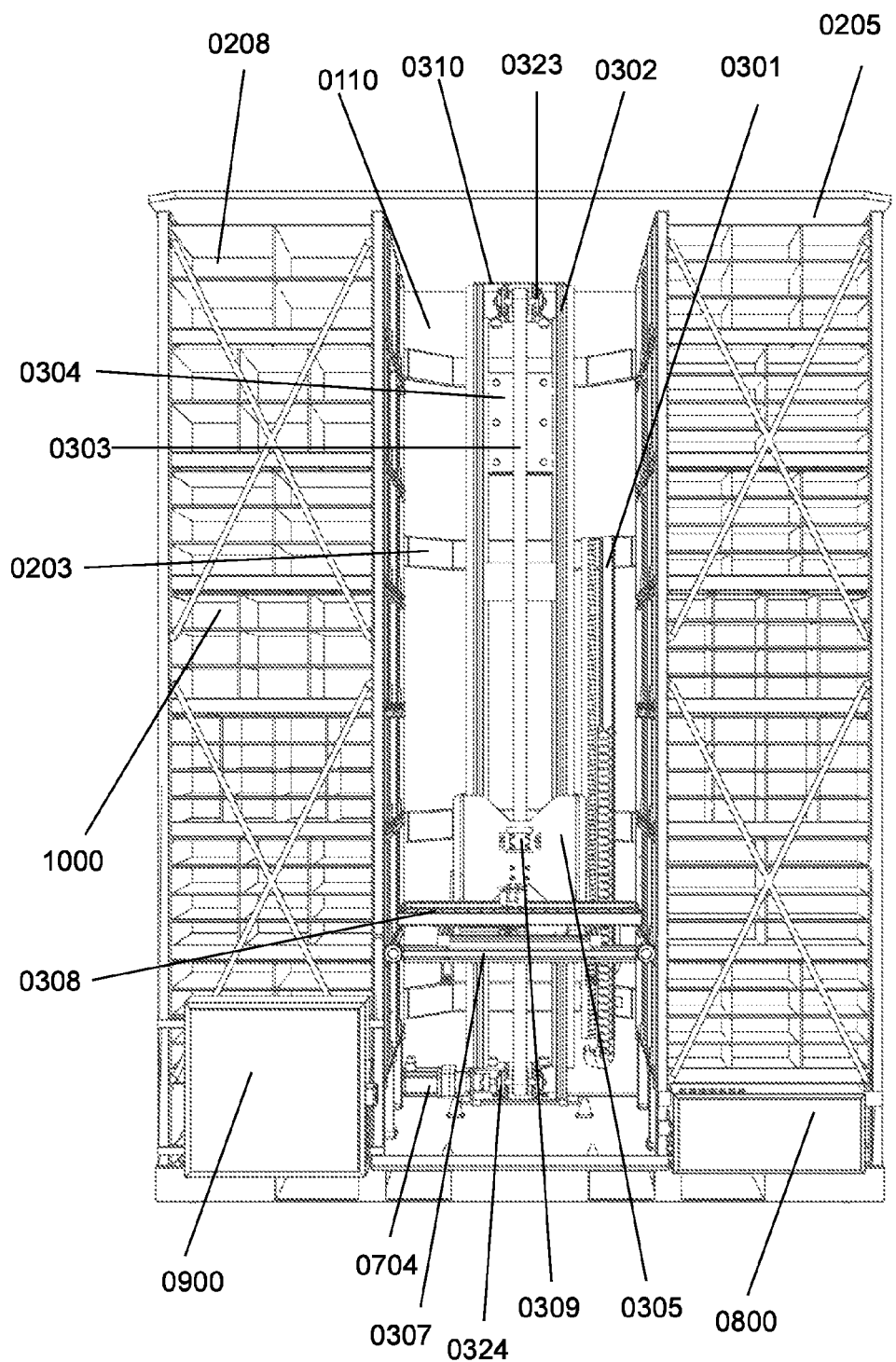
FIG. 4 shows the front view of the shelving system in FIG. 2 together with the lift module, electrical board and electricity module, and with parcel containers.

Drawing FIG. 4 shows the front view of the shelving system with the lift module 0300, main boom motor 0704, drive module 0800 and electricity module 0900 and parcel container 1000.

Figure 5:
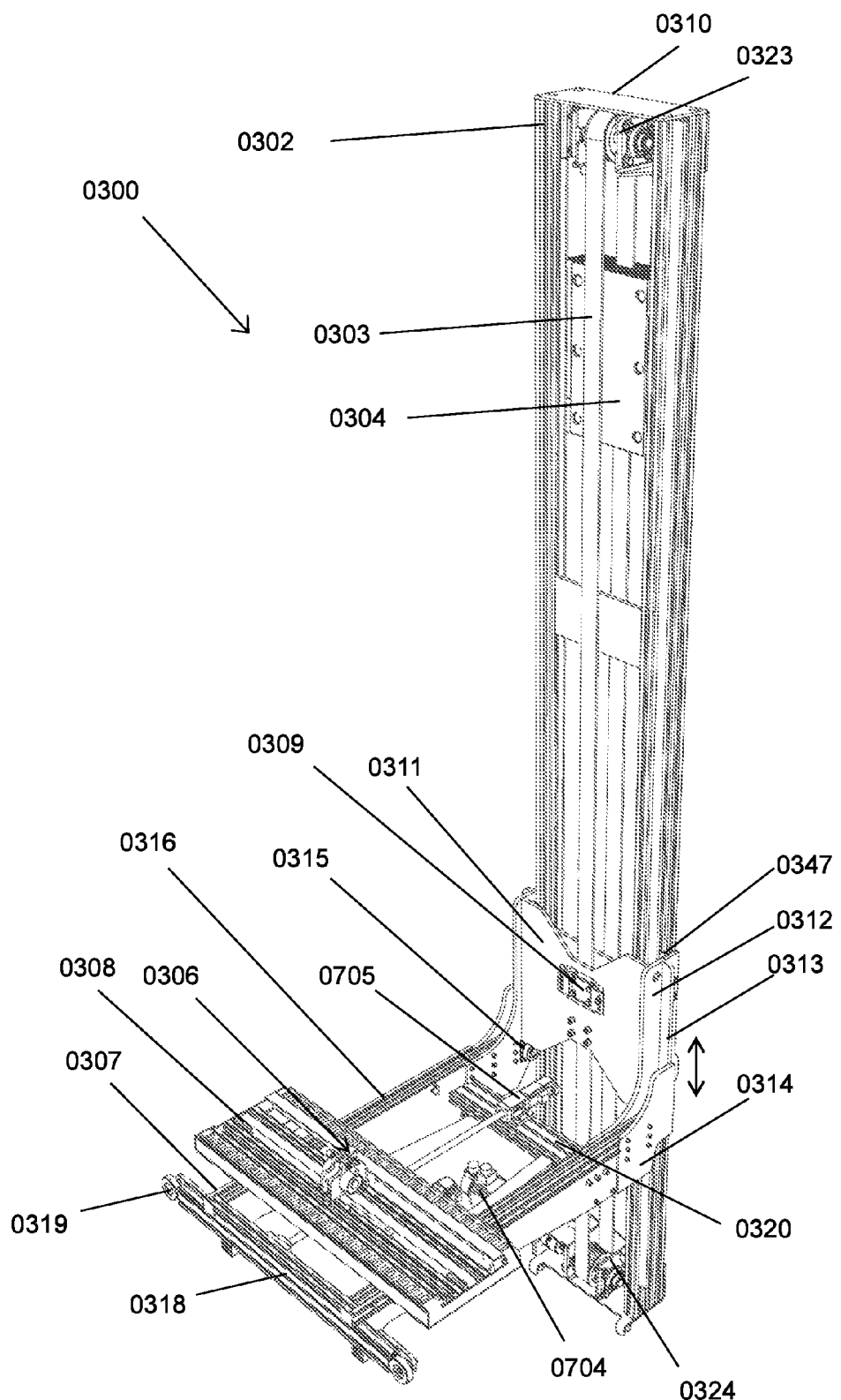
FIG. 5 shows a perspective view of the lift module.

Drawing FIG. 5 shows a perspective view of the lift module 0300. Lift module 0300 comprises an energy chain 0301, a main boom 0302, a carriage 0305, a positioner 0307, a loader 0308, a belt pulley module 0323 fastened to the upper part of the main boom 0302 and a pulling module 0324 of the main boom fastened to the lower end, and a belt 0303 fitted on the belt pulleys over the belt pulley module 0323 and pulling module 0324, a counterweight 0304 fastened to the belt 0303, a carriage 0305 fastened to the main boom 0302 that moves with rollers 0347 along the main boom which has been connected to the one end of the energy chain 0301 by tension adjuster 0309, a positioner 0307 fastened to the carriage 0305 and a loader 0308. The pulling module 0324 of the main boom 0302 is connected to the motor 0704.

Energy chain 0301 has been fastened to the bracket 0203. One end of the energy chain 0301 has been fastened to the carriage 0305 and another end has been connected to the drive module 0800.

The belt 0303, in the preferable embodiment of the self-service parcel terminal, comprises two parts, the upper ends of both of which have been fastened to the counterweight 0304 and lower ends to the carriage 0305 and tension adjuster 0309.

Carriage 0305 comprises two connecting plates 0311, two L-shaped side supports 0312 for the connecting plate 0311, supplementary plate 0313 of the side support, supplementary support 0314 and rollers 0315, whereas the side support 0312 and supplementary support 0314 have been fastened to the connecting plate 0311 of the carriage and supplementary plate 0313 so that a gap has been created to attach the positioner 0307. The carriage 0305 comprises a tension adjuster 0309 added to the belt 0303.

Figure 6:
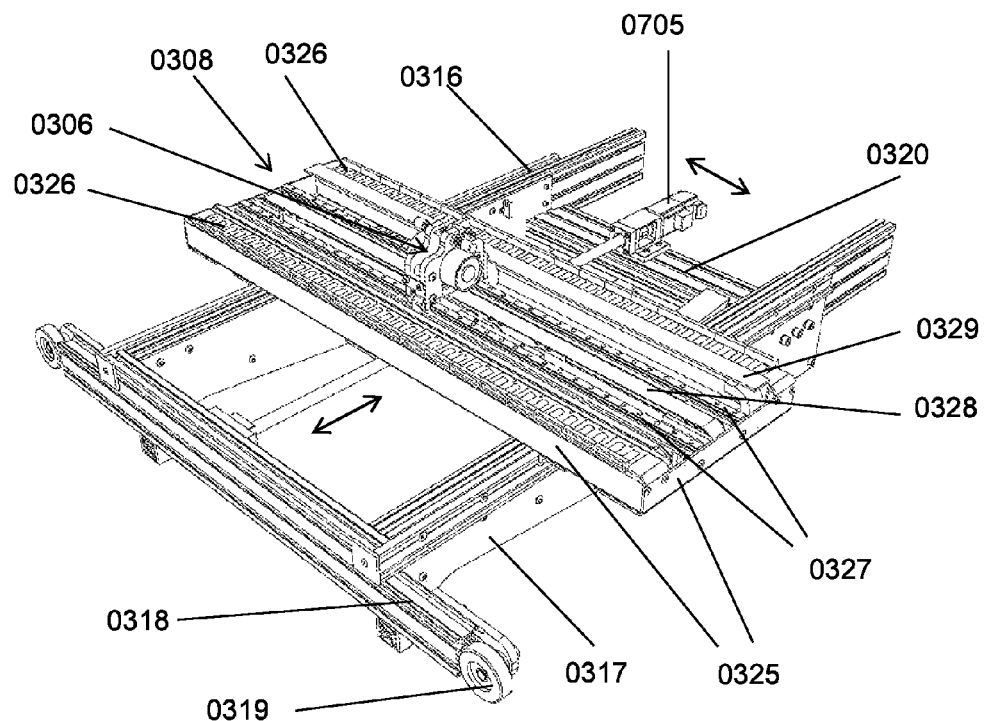
FIG. 6 shows a perspective view of the positioning device of the lift module and the loader.

Drawing FIG. 6 shows a perspective view of the positioner 0307 of the lift module 0300 and of the loader 0308 attached to it. The positioner 0307 comprises two at least double-layer shoulders 0316, both of which have been connected between the side plate 0312 of the carriage 0305 and supplementary support 0314, of positioner side supports 0317, positioner bracket for position rollers 0318 and positioner position rollers 0319 fastened to its ends, positioner motor fastening plate 0320, loader motor 0706 together with positioner motor 0705 for moving the loader 0308.

Figure 7:
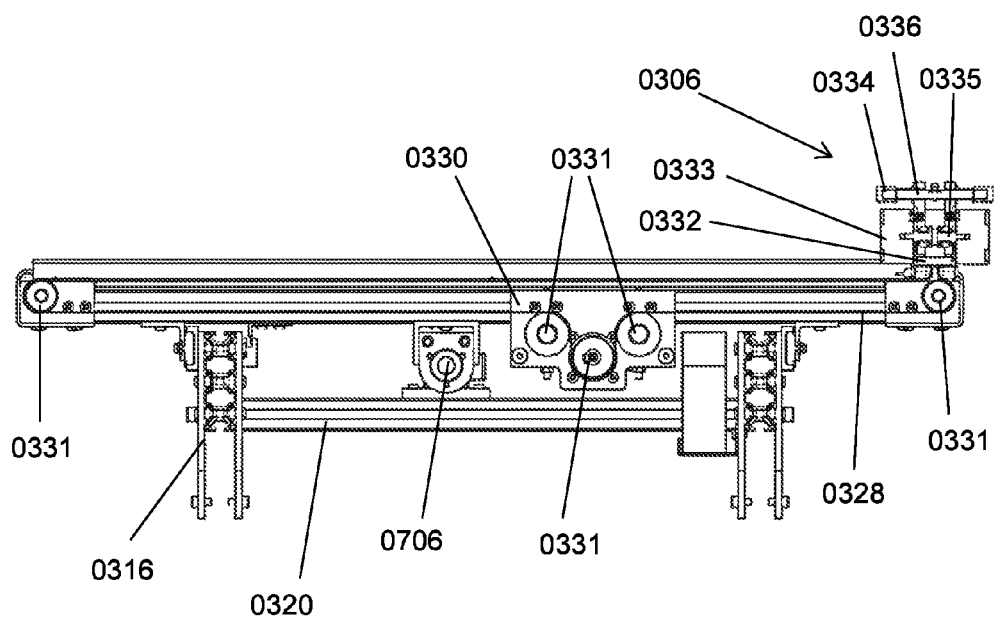
FIG. 7 shows the front view of the positioning device of the lift module and the loader.

The loader 0308 shown in drawings FIG. 6 and FIG. 7 comprises a frame 0325, rollers 0326 located on both longer edges of the frame, positioner rails 0327, pulling belt 0328, the edge 0329 restricting uplifting parcel containers 1000, the fastening plate 0330 of the loader pulling motor, drive wheels 0331 and magnetic mechanism 0306.

Drawing FIG. 7 shows a belt fastening that enables magnets to grab hold of the parcel containers that are farther away from the belt pulleys. Magnets can be taken onto the sidemost belt pulley.

Figure 8:
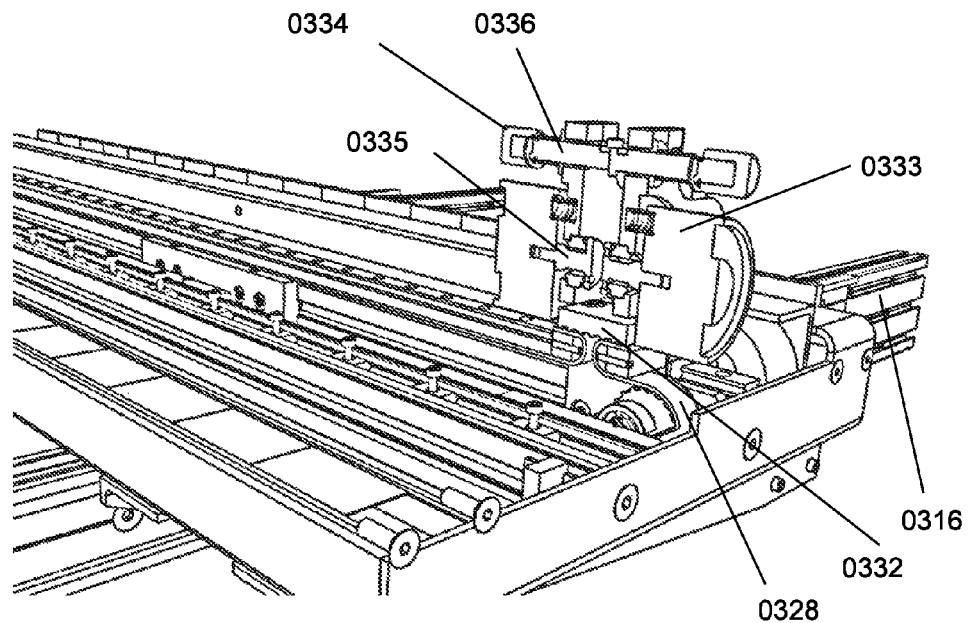
FIG. 8 shows a perspective view of the section of the loader magnetic mechanism in FIG. 7.

The magnetic mechanism 0306 in drawings FIG. 6, FIG. 7 and FIG. 8 comprises the belt fastening plate 0332 of the magnetic mechanism, an electromagnet 0333, end cover 0334 for the stay bolt in the upper part of the magnetic mechanism, tight-fitting bolt of the electromagnet 0335 and sensor stay bolt 0336, together with the sensor, provide feedback on the distance between the box and magnet. When the magnetic head moves to the box and is close enough, contact occurs with the cover of stay bolt 0334 and with the magnetic plate of the box. As a result, the stay bolt 0336 will move away from its central position thus cutting the signal in the sensor. When in the uploading process the stay bolt moves to the central position it allows to assume that the box has moved away from the magnet, and the uploading process is cancelled. The tight-fitting bolt of the magnet on the hinge joint compensates the possible up-down and sideways movements of the parcel container caused by possible lack of smoothness upon moving the parcel container.

Fastening of the magnet is located in the central part of the magnetic mechanism. The magnet has been fastened to the webs 0335 of the magnetic mechanism with the help of a joint (hinge joint) in order to exclude the force arms between the box and magnet. The fastening of the belt of the magnetic head is located in the lower part of the magnetic mechanism. The belt fastening carried out by belt fastening plate 0332 allows the magnets to take hold of parcel containers that are farther away from the belt pulleys, and magnets can be taken onto the side-most belt pulley, if necessary.

The movement of the lift module 0300 components is guided, in order to place parcel containers 1000 onto the shelves and taking them from the shelves, in a way that the carriage 0305 with the positioner 0307 is guided up and down along the length of the main boom 0302, and the loader 0308 fastened onto the positioner 0307 connected to the carriage 0305 is guided up-down and left-write on the positioner 0307. Parcel containers 1000 are guided onto the shelves and out of shelves on the rollers 0209 by the magnetic mechanism 0306 of the loader 0308. Parcel containers 1000 are located at different levels/heights, behind each other, and one box at a time is moved. Whereas the shoulders 0316 of the positioner 0307 have been made with such a length that the positioner position rollers 0319 fastened to the ends of the bracket 0318 of the position rollers fastened to the shoulders are supported by the inside of the first front support poles 0202.

Figure 9A:
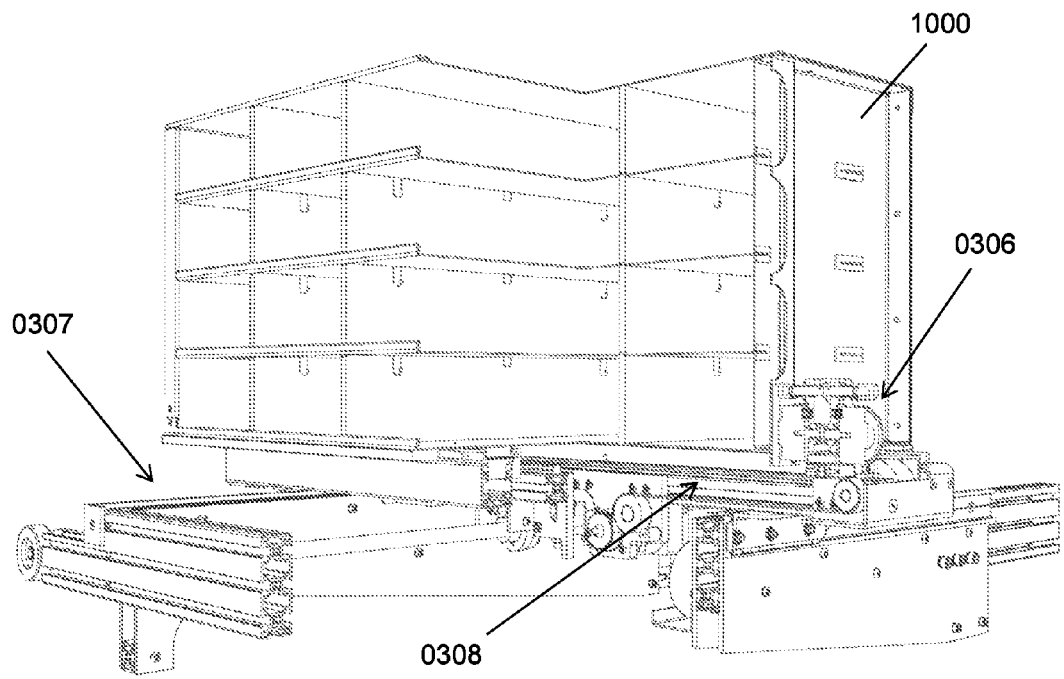
FIG. 9a shows the position of the magnetic mechanism upon pushing the parcel container into the shelf/drawing from the shelf in the side-most position of the magnetic mechanism on the loader.

Drawing FIG. 9a shows the position of the magnetic mechanism 0306 upon pushing the parcel container 1000 into the shelf/drawing from the shelf in the side-most position of the magnetic mechanism 0306 on the loader 0308.

Figure 9B:
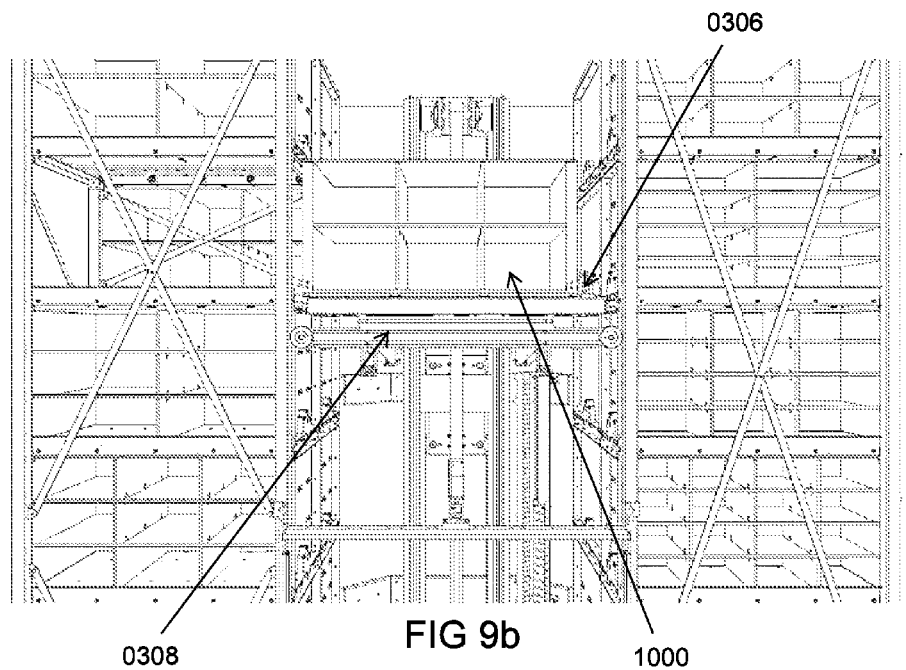
FIG. 9b shows the front view of the shelving system with the position of a parcel container upon pushing it into the shelf/drawing from the shelf.

Drawing FIG. 9b shows the front view of the shelving system with the position of a parcel container 1000 upon pushing it into the shelf/drawing from the shelf.

Figure 9C:
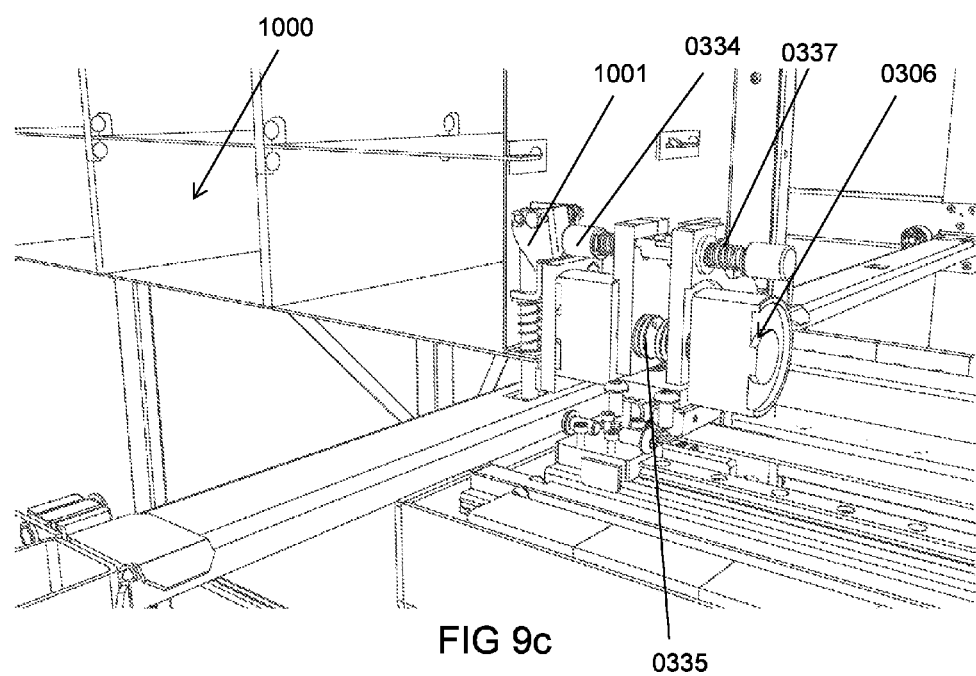
FIG. 9c shows the position of the magnetic mechanism upon pushing the parcel container into the shelf/drawing from the shelf in an alternative embodiment to the invention where parcel containers with locking mechanism have been used.

Drawing FIG. 9c shows the position of the magnetic mechanism 0306 upon pushing the parcel container 1000 into the shelf/drawing from the shelf in an alternative embodiment to the invention where parcel containers 1000 with locking mechanism 1001 have been used. Drawing FIG. 9c also shows the cross section of the magnetic mechanism 0306 and the stay bolt 0334 and the centering spring 0337 for the sensor stay bolt.

Figure 10A:
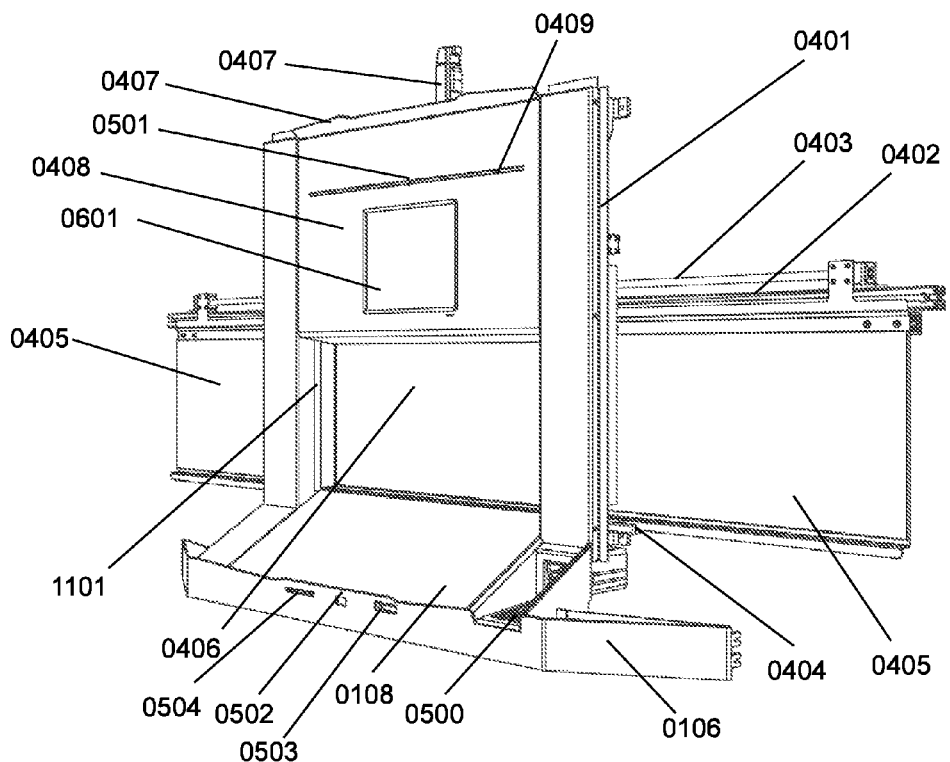
FIG. 10a shows a perspective view of the door system with door hatches in their open positions in the preferable embodiment of the invention.
Figure 10B:
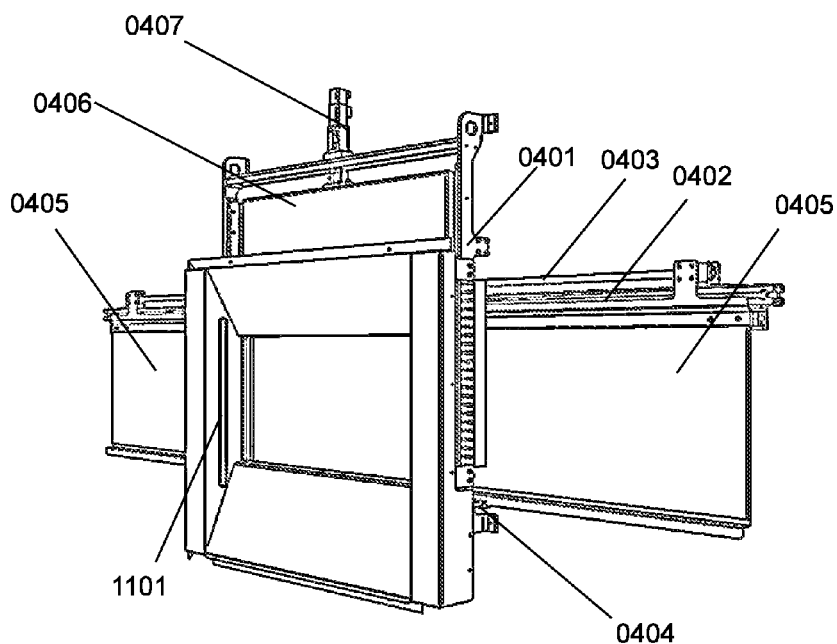
FIG. 10b shows a perspective view of the door system with door hatches in their open positions in an alternative embodiment of the invention.

Drawings FIG. 10a and FIG. 10b show a perspective view of the door system 0400 with horizontal door hatches in their open and the vertical door hatch in its closed positions in the preferable embodiment, and with door hatches in their open positions in an alternative embodiment of the invention. The door system 0400 comprises the frame 0401, two horizontal door panels 0405 attached to the frame 0401 and set on at least one upper slider 0402 and rail 0403 and moving on at least one lower slider 0404, a vertical door panel 0406 inside the frame 0401, and a trapezoid 0407 attached to the frame 0401 for moving the vertical door panel 0406, door system panel 0408 and safety curtain 0901. In the preferable embodiment of the invention the door system panel 0408 has been added a camera 0501, design stripe 0409, a sheltering roof 0107, computer screen 0601 and a belt 0106, device box 0108, receipt printer 0504, scanner 0502, a sticker tag printer 0503, payment module 0500 have been attached to the lower edge of the frame 0401.

Payment module 0500 comprises, for example payment by card, in cash, via mobile phone, NFC/QR etc. payments based on contactless technology, biometric or other similar types of payment, applications to identify the person (e.g. chip card reader, camera, fingerprint reader or iris recognition scanner), a printer, keyboard/pinpad, scanner (barcode, QR), computer, camera.

Figure 11:
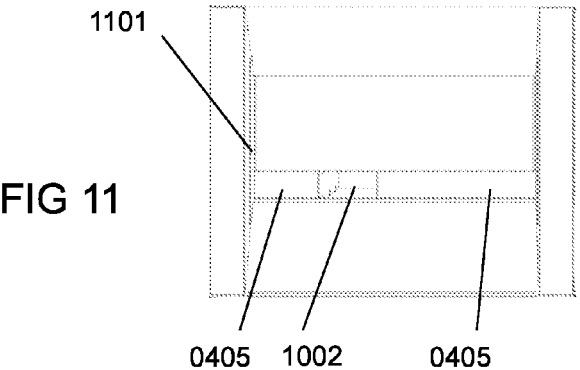
FIG. 11 shows the front view of door system with one compartment slot open.

Drawing FIG. 11 shows the front view of door system 0400 with one compartment slot 1002 of the parcel container 1000 open.

Figure 12:
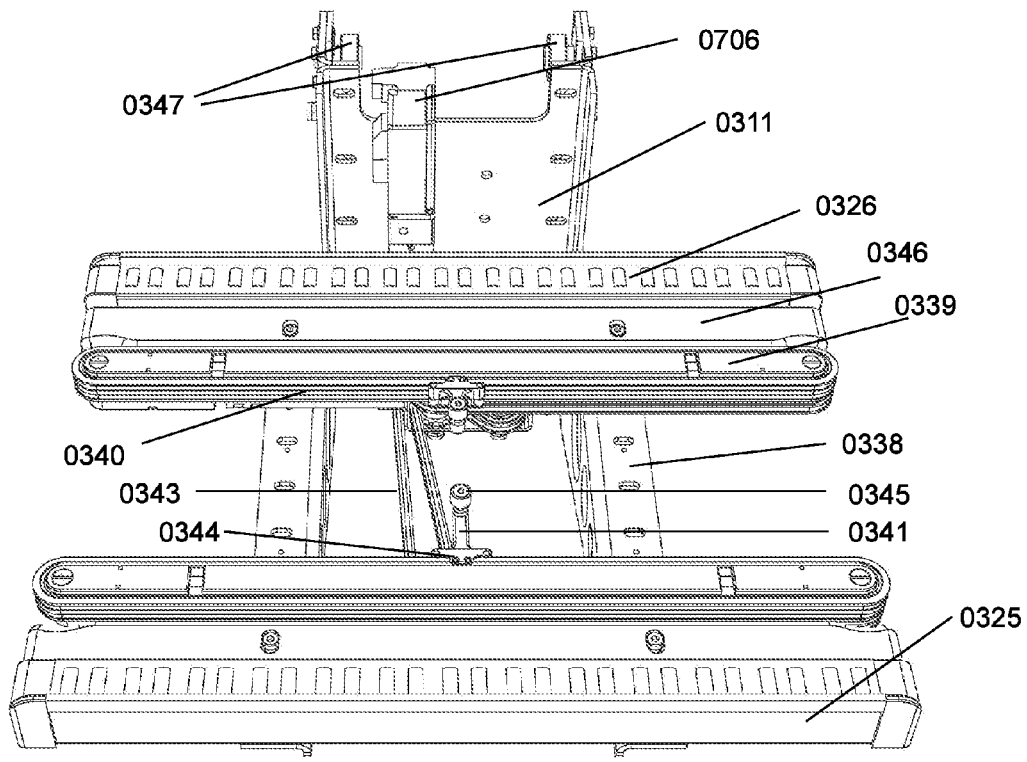
FIG. 12 shows the front view of the loader in an alternative embodiment of the invention.

Drawing FIG. 12 shows the front view of the loader 0308 in an alternative embodiment of the invention. In the alternative embodiment of the invention, the loader 0308 comprises a support frame 0338 attached to the connecting plate 0311, two guides 0339, chain 0340 fastened around the guides 0339, a lever 0341 attached to either chain 0340 to move parcel containers 1000, frames 0325 and rollers 0326 attached to the outer walls of the guides 0339, gear wheels 0342 attached to the lower sides 0339 and the connecting plate 0311 of the guides 0339, transmission chain 0343 attached around the gear wheels 0342, two support plates 0346 for the guide, loader motor 0706. In an alternative embodiment of the invention, one guide 0339 with one level 0341 has been used between rollers 0326.

Figure 13:
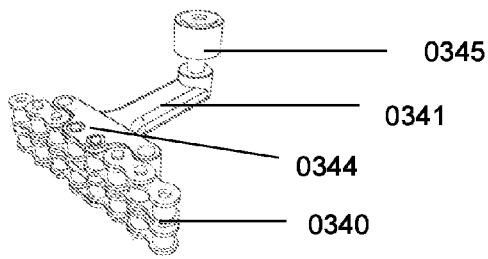
FIG. 13 shows a perspective view of the connection between the lever and a link and the chain.

The motor of the positioner 0705 sets the transmission chain 0343 moving, which, in its turn, sets moving the chain 0340 that has levers 0341 attached to it. The levers 0341 work as one link 0344 of the chain 0340. Rollers 0345 have been attached to the ends of the levers 0341. The connection of the lever 0341 and link 0344 to the chain 0340 is shown in the drawing FIG. 13.

Figure 14:
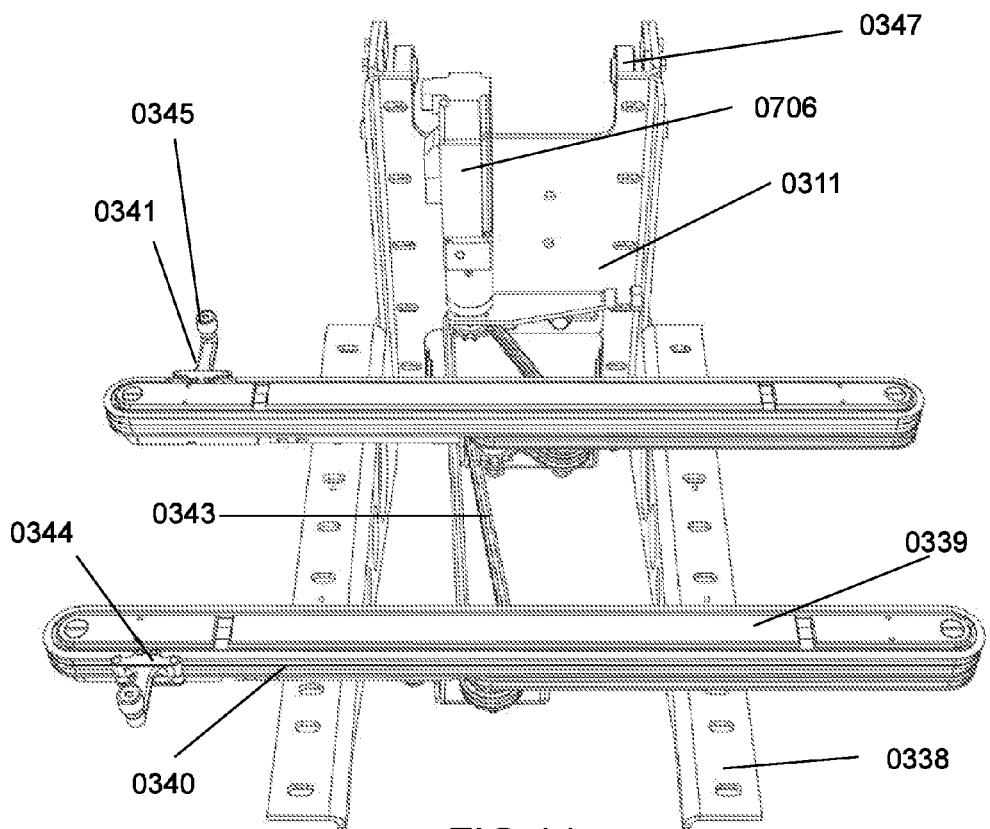
FIG. 14 shows the front view of the loader in an alternative embodiment of the invention, depicting the connection between the transmission chain and the motor.

Drawing FIG. 14 shows the front view of the loader 0308 in an alternative embodiment of the invention, depicting the connection between the transmission chain 0343 and the positioner motor 0705.

Figure 15:
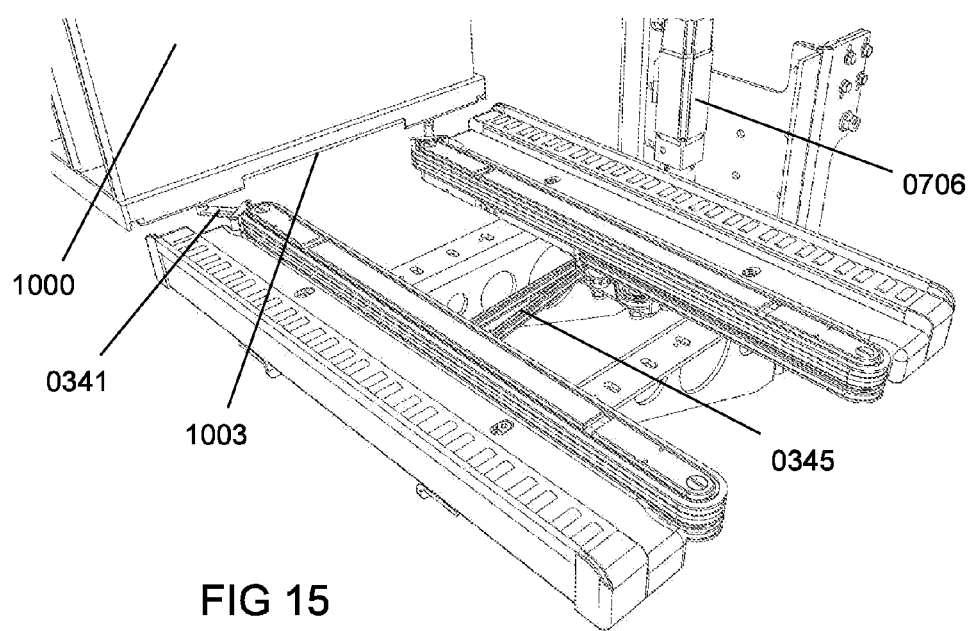
FIG. 15 and FIG. 16 show a perspective view of an alternative loader embodiment with a parcel container where taking the parcel container from the shelf and placing it onto the shelf have been shown by the help of levers.
Figure 16:
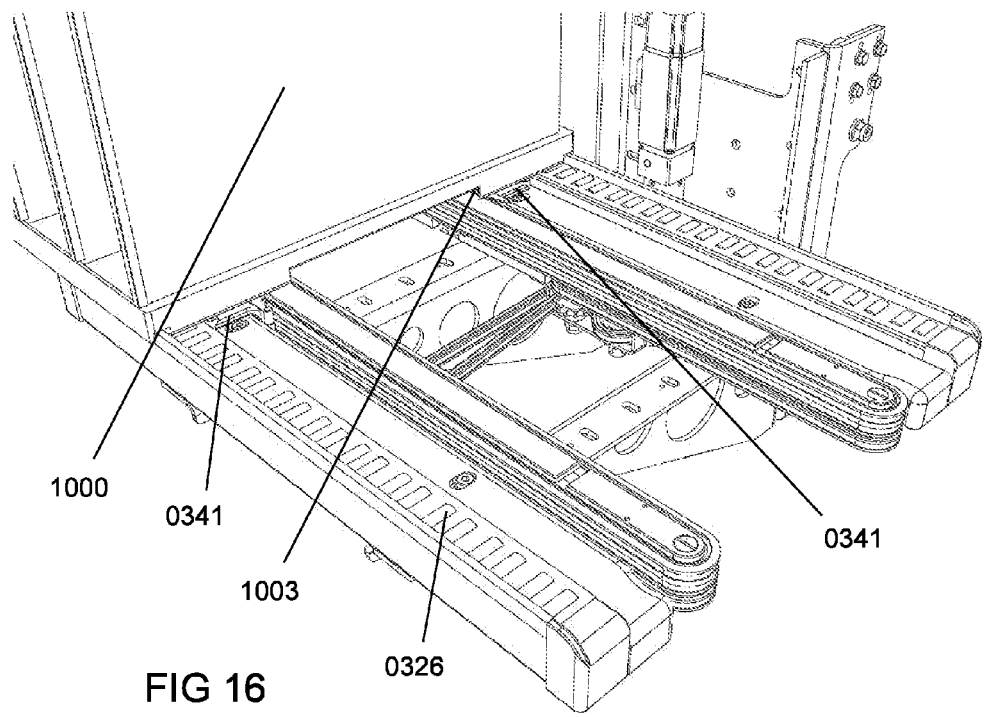

Drawings FIG. 15 and FIG. 16 show a perspective view of an alternative loader 0308 embodiment with a parcel container 1000, where taking the parcel container 1000 from the shelf and placing it onto the shelf has been shown by the help of levers 0341. In the case of such an alternative embodiment, parcel containers 1000 with a groove 1003 added to their lower edge for the rollers 0345 of the levers 0341 have been used in the system. In order to place the parcel container 1000 onto the shelf or taking it from the shelf, the levers are guided into the groove 1003 of the parcel container 1000 by the positioner motor 0705, transmission chain 0343, and chains 0340. In order to take the parcel container 1000 from the shelf, the levers 0341 are guided, with the help of rollers 0345, into the groove 1003, levers 0341 are guided with the help of chains 0340 so that they are perpendicular to guides 0339, that are used to pull the parcel container 1000 from the shelf onto the loader 0308 over the rollers 0326.

Figure 17:
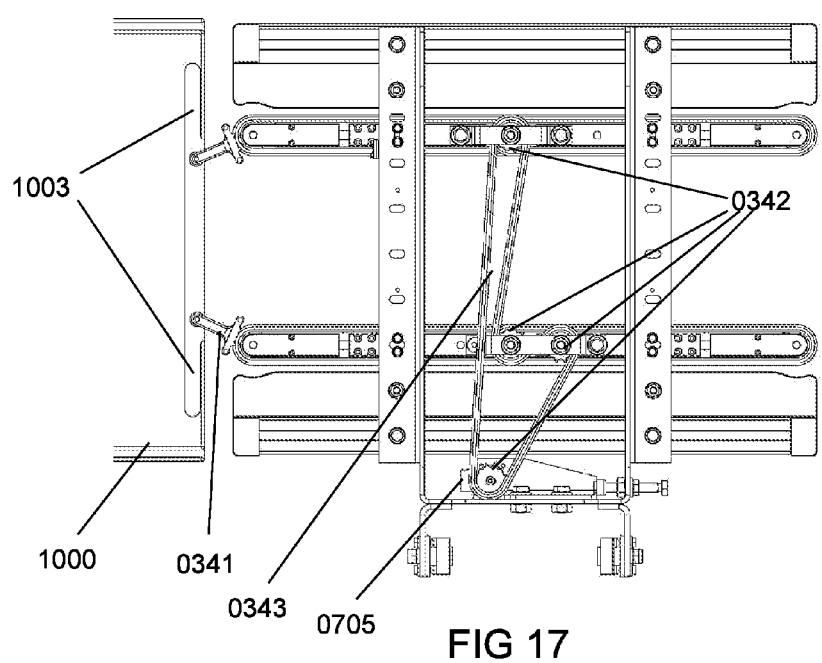
FIG. 17 shows an alternative embodiment of the loader with a parcel container, viewed from below.

Drawing FIG. 17 shows an alternative embodiment of the loader 0308 with a parcel container 1000, viewed from below, and showing the positioning of the transmission belt 0343 and connection with the guides 0339 and the positioner motor 0705, and guiding the levers 0341 into the groove 1003. Chain transmission has been built so that the levers would move at maximum distance from each other while pulling the parcel container, and the pulling capacity of the lever is achieved to the in the moving direction of resting of the support rollers of the lever from the front to the support plate of the guide, and from behind to the chain, which, in its turn, rests on the guide of the chain.

Figure 18:
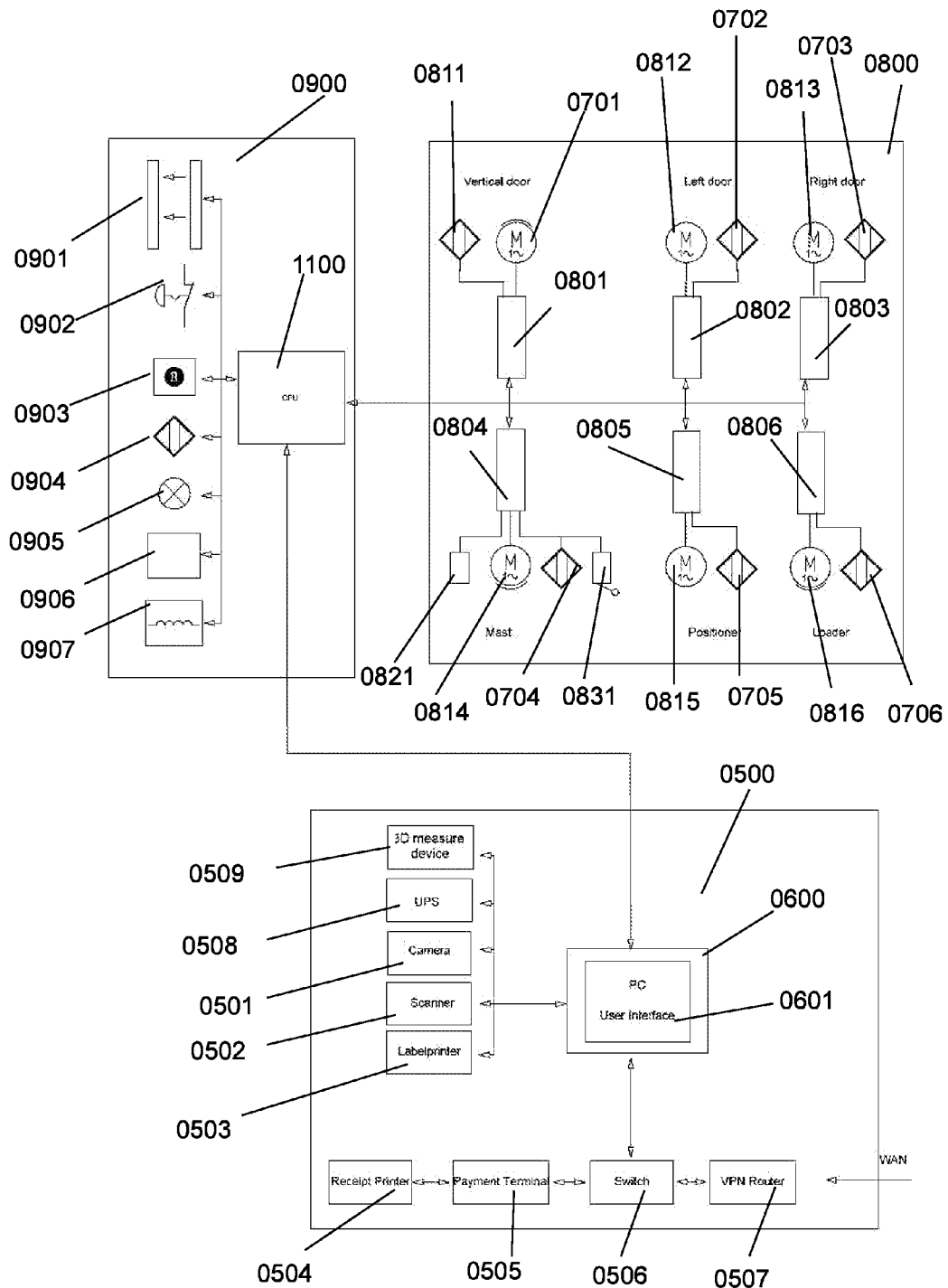
FIG. 18 shows the preferable embodiment of the block diagram of the connections between the electronics components and automated systems of the self-service parcel terminal.

Drawing FIG. 18 shows the preferable embodiment of the block diagram of the connections between the electronics components and automated systems of the self-service parcel terminal, comprises payment module 0500, computer 0600 and user interface 0601, drive module 0800, electrical board with safety solutions 0900. Computer 0600 and user interface 0601 contain software for adjusting the settings, running and usage of the terminal.

Payment module 0500 together with a computer 0600 contain, for example, payment solution with pinpad, sticker tag printer, receipt printer, scanner, VPN router, Switch, computer, camera, uninterrupted power supply (ups), 3-dimensional measuring device, or other such components or devices to identify a person, receive or send parcels, make payments or other transactions related to the transactions mentioned above. Payment module 0500 comprises an external Internet connection (WAN) and the computer 0600 is connected to CPU 1100. In the sample embodiment of the present invention, the payment module 0500 comprises a camera 0501, scanner 0502, label printer 0503, receipt printer 0504, payment solution device 0505, switch 0506, router 0507, UPS 0508, 3D measuring device 0509 and broadband port 05010 (WAN). The computer 0600 is connected to the camera 0501, scanner 0502, label printer 0503, UPS 0508, 3D measuring device 0509 and switch 0506 and connected to CPU. The switch 0506 is connected to the router 0507 and payment terminal 0505 comprising a receipt printer 0504.

Electrical board 0900 comprises a controller, safety curtain 0901 connected to the door system, stop circuit 0902, electromagnetic guide 0903, parcel container distance sensor 0904, door lighting 0905 attached to the door system, temperature adjuster 0906 and electromagnetic lock of the payment solution 0907.

The module 0800 for controlling motors comprises one or several converters, zero point sensors, limit switch, braking resistor (main boom motor). The module 0800 is connected to 0900 electrical board motor that transmits commands for controlling motors.

The drive module 0800 in the preferred embodiment of the solution comprises a vertical door converter 0801, left horizontal door converter 0802, right horizontal door converter 0803, main boom converter 0804, positioner converter 0805 and loader converter 0806 which are all connected to each other, whereas each converter is connected to the relevant sensor and motor.

More precisely, vertical door converter (drive) 0801 is connected to the vertical door sensor (home sensor) 0811 and vertical door motor 0701, left horizontal door converter 0802 to the left horizontal door sensor 0812 and left horizontal door motor 0702, right horizontal door converter 0803 to the right horizontal door sensor 0813 and right horizontal door motor 0703, main boom converter 0804 to the main boom sensor 0814 and main boom motor 0704, positioner converter 0805 to positioner sensor 0815 and positioner motor 0705 and loader converter 0806 to loader sensor 0816 and loader motor 0706, main boom converter 0804 has additionally been connected to brake resistor 0821 and limit switches 0831.

Figure 19:
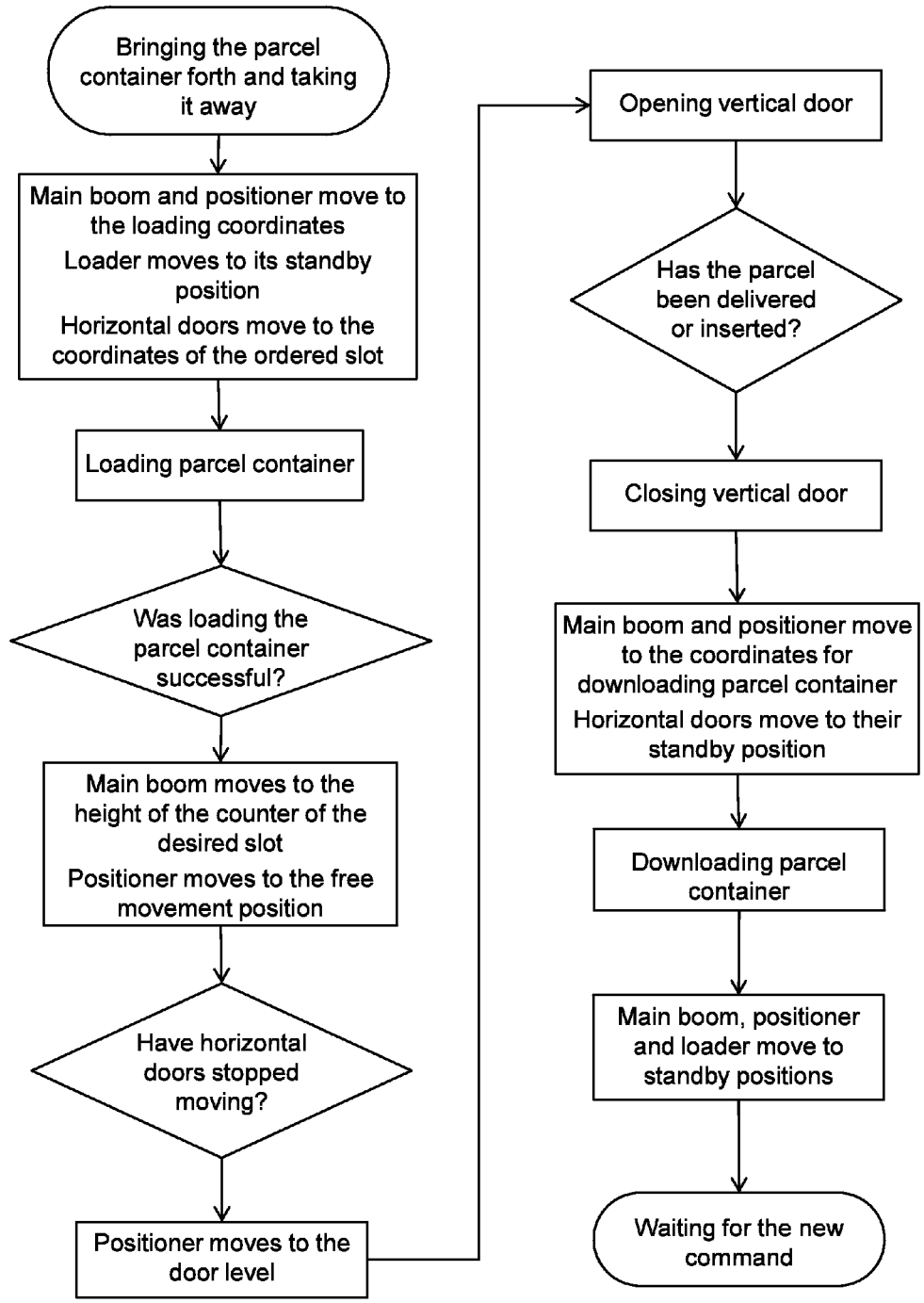
FIG. 19 shows the block diagram of the processes carried out in the self-service parcel terminal in its preferable embodiment.

Drawing FIG. 19 shows the block diagram of the processes carried out in the self-service parcel terminal in its preferable embodiment. The work processes of the self-service parcel terminal involve commands to be entered by the user, and relevant transactions to be carried out at the terminal, bringing the parcel container 1000 and taking it away; guiding the main boom 0302 and positioner 0307 to the loading (incl. loading goods into the terminal and retrieving from the terminal, bringing parcel containers forth from the shelf and taking to the shelf) coordinates; loader 0308 movement to the stand-by position; moving horizontal doors 0405 to the coordinates of the ordered slot; loading parcel containers; loading check; main boom movement to the height of the desired slot counter; positioner movement to the free movement position; horizontal doors movement completion check; positioner movement to the door level; opening the vertical door; parcel delivery and/or loading check; closing the vertical door; main boom and positioner movement to the box downloading coordinates; horizontal doors movement to stand-by position; box downloading; main boom, positioner, loader movement to the stand-by position; terminal stand-by position.

In order to bring the parcel container 1000 forth and take it away, and for opening door panels at the right place, user interface is used to send a command to the controller containing coordinates of the parcel container and the location of the slot in that parcel container. After having received the command, the door panels, main boom 0302, positioner 0307 are guided to the relevant position. The loader 0308 is guided to the standby position for pulling the parcel container 1000. Pulling the parcel container 1000 continues when the main boom 0302 and positioner 0307 have forwarded the signal of their arrival. Immediately before loading it is checked that the main boom 0302 and positioner 0307 have received the coordinates of the same parcel container. In the case when the main boom 0302 and positioner 0307 have been transmitted different coordinates for the parcel container 1000, no loading is allowed. Then starts the loading of parcel container. The loader 0308 drives the magnetic head of the magnetic mechanism 0306 up to the catch plate of the parcel container. Upon the signal of arrival, the electromagnet is switched on. The motor starts working in reverse direction and the parcel container is pulled onto the loader 0308. In the next stage the parcel container is brought behind the door system 0400 by moving the main boom 0302 and positioner 0307. Horizontal door panels 0405 are guided to their proper positions, parcel container is pressed against the door seals and the vertical door panel 0406 is then opened. In order to take the parcel container 1000 to the shelf, the given process is carried out in its reverse order—the vertical door plate 0406 will close, then the parcel container is moved away from the seals of horizontal door panels 0405, and the main boom 0302 as well as the positioner 0307 are guided to the coordinates of the parcel container. Downloading the parcel container begins upon the permitting signal of. In the end position the electromagnet is released and the loader 0308 is guided to the central position, or uploading a new parcel container begins.

Figure 20:
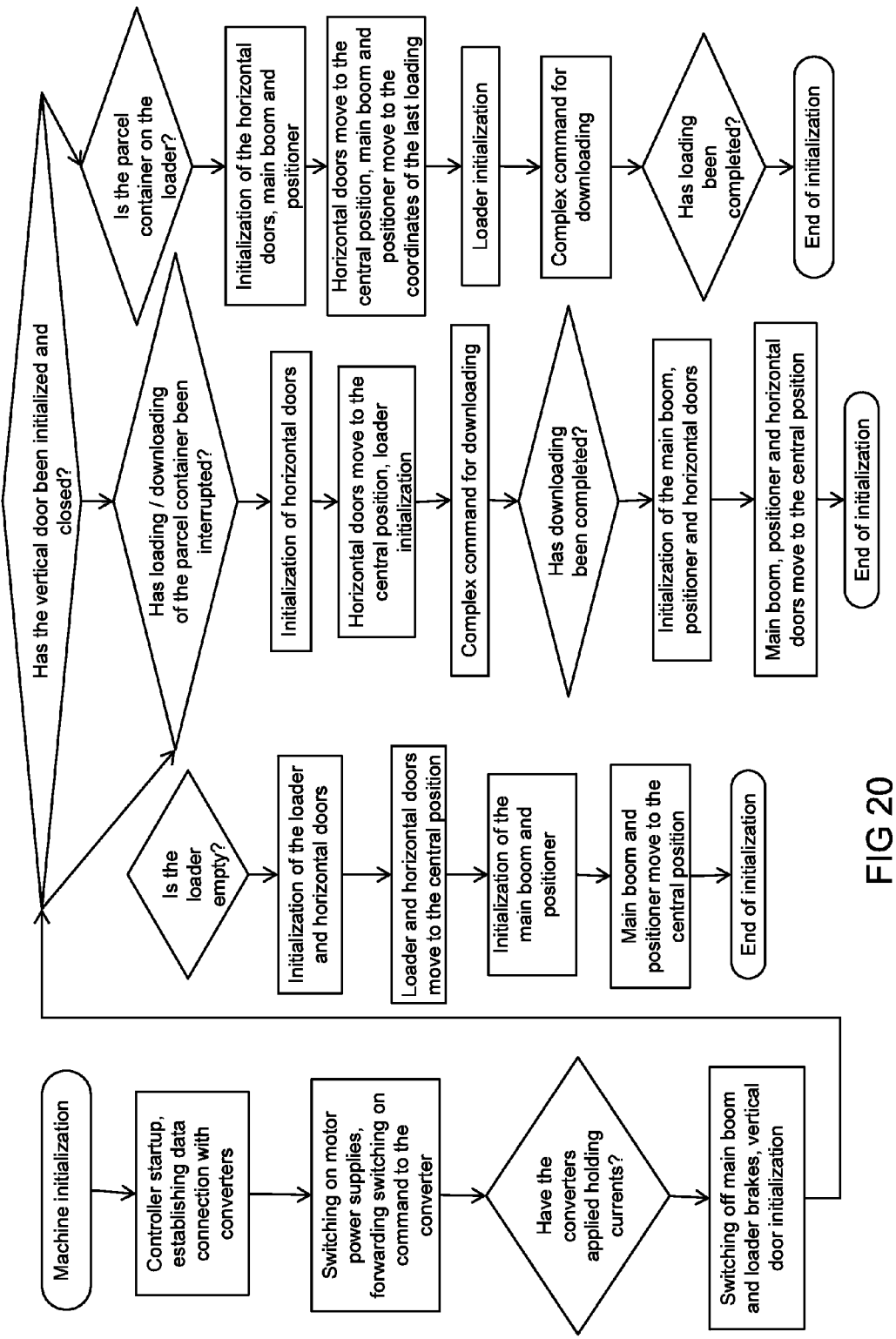
FIG. 20 shows the initializing processes of the self-service parcel terminal in its preferable embodiment.

Drawing FIG. 20 shows the initializing processes of the self-service parcel terminal in its preferable embodiment which comprises initializing the machine; uploading the controller and creating data connection with converters; switching on motor power supplies and forwarding the switching on command to the converters; check-up of applying the holding current of motors; switching off main boom and loader brakes, vertical door initialization; check-up of vertical door initialization and closing and checking loader status. Loader status check checks if the loader is empty; if loading/downloading has been interrupted; if the parcel container is on the loader.

If the loader is empty stage includes the initialization of the loader and horizontal door; moving the loader and horizontal doors into central position; initialization of the main boom and positioner; guiding the main boom and positioner into central position; finishing initialization.

If the loading/downloading stage includes initialization of horizontal doors; guiding horizontal doors into central position, initialization of the loader; downloading complex command; checking that downloading has finished; initialization of the main boom, positioner and horizontal doors; guiding the main boom, positioner and horizontal doors into central position; finishing initialization.

If the parcel container is on the loader stage includes the initialization of horizontal doors, main boom and positioner; guiding horizontal doors into central position; guiding the main boom and positioner to the coordinates of the last loading; initialization of the loader; downloading complex command; checking that downloading has finished; finishing initialization.

Self-service parcel terminal is operated by a computer 0600 (for example a touch screen computer), that forwards complex commands to the controller (for example an industrial controller CPU). The controller has been preprogrammed for all possible movements. The movements have been defined one at a time. A complex command is forwarded to the controller which shows the movements that need to be made.

Controller operates the AC servo motors to move the door panels 0405 and 0406 of the door system 0401. Each axle has 1 sensor that marks the 0-point of that axle. Light sensors are used for the purpose (for example Fork light barrier, LED, infrared). Upon starting up the self-service parcel terminal the axles are reset. The zero point sensors of other movements are not used during machine work. Except for the zero point sensor of the vertical door panel 0406 the other output of which is used to check the status of the door system 0401 and for doubled check-up operation which excludes movements by other motors when the vertical door panel 0406 is open.

The energy created by the braking of the main boom 0302 motor 0704 is directed to the braking resistor which is there converted into warmth.

Magnetic mechanism, comprising electromagnets 0333 that are switched at controller output, is used to move parcel containers 1000. Magnetic mechanism 0306 is kept switched on until the parcel container 1000 is fully back on the shelf.

One sensor is used while moving parcel containers 1000 in order to check the distance between the parcel container 1000 and magnetic mechanism 0306, whereas the sensor checks this way both sides of the loadable parcel containers 1000. In the case where the distance is bigger than the defined distance, the signal from the sensor switches the controller into reloading mode.

Communication between the controller and converters is carried out via data connection line, in the preferable embodiment, for example CANopen or some other communication protocol in an alternative embodiment. CANopen extension module and divider are applied on the controller for that purpose. Converters have an integrated CANopen data connection readiness. Controllers are constantly forwarded information about all axles and the controller forwards new commands via one channel. In an alternative embodiment of the invention, for example, the motors are guided by inputs and outputs.

Safety curtains 1101 that have been chosen with fingerprint recognition are used as a safety sensor. The output of safety curtain 1101 guides security relay. If an object (for example, the hand of a customer/courier or some item that has fallen into the door system slot) happens to get into the safety curtain 1101, the power supply circuits of the vertical door motor are cut off, the motor brake of the vertical door is applied, signal is sent to the converter of the motor of the door panels and the controller. The safety curtain is released in order to resume functioning and the functioning resumes automatically.

In order to guarantee safety, the smart features of converters are taken further advantage of. The turning moment of the motor is checked upon closing the door panels. When the turning moment is higher than the defined value, the door panels open into their previous position. For example, in the case where something is between the door and the counter, and is, at the same time, inside the curtains, or the security circuit fails to operate. In order to give the command to reset the safety curtains, both inside relays of the security relay are applied, for example, in a situation when some security device does not function properly.

The opening and closing of the door panels 0405 and 0406 of the door system 0400 has been programmed according to the measures of the different types of compartments 1002 of the parcel container 1000, whereas the parcel container 1000 comprises one or more compartments 1002 that can vary in size according to the usage purpose of the postal parcel terminal.

In an alternative embodiment of the self-service parcel terminal the door panels 0405 and 0406 are moved by DC carbon-brush motor, limit switches, cammed rails, where the sensor/limit switch identifies gaps and a step-by-step locking mechanism.

While adjusting the settings of the self-service terminal, the zero points are determined where the positions of the motor are matched with converters and converter settings are adjusted so that the motors would move in right the right directions. Converters are used to guide the motors to coordinates in relation to the zero point. Each axle has one zero point. Each time controller is started up, it begins with initialization process where axles in their fixed order do a reset. Three different initialization programs are chosen from, depending on the position the machine came to a standstill in. All axles are guided to the central position when the terminal initialization process is finished.

In order to guarantee security, for example, in the case of a power outage when UPS cannot supply enough energy, the information about whether the parcel container 1000 is on the loader 0308 or not is kept in memory of the terminal to finish the processes. In the case when the parcel container 1000 is on the loader, resetting is carried out so that the parcel container 1000 is placed back onto the shelf. Initializing the loader 0308 is in such a case the last one to be carried out.

When resetting of the main boom 0302 and positioner 0307 has been completed, they are guided to the coordinates where the parcel container is missing. The given information is saved in the terminal memory. Loader 0308 resetting is then safely started since the parcel container is moved onto the relevant shelf upon moving the loader.

Upon losing the box, when electromagnet breaks loose from the parcel container due to, for example, overloaded parcel container or technical malfunctioning, the distance between the magnetic head and parcel container or the contact, is checked with the sensor attached to the magnetic head. In case when the status of the sensor changes in the pulling stage, electromagnet is released. Loading process is then restarted. The loader 0308 is once again guided to the final coordinates of the loading. Parcel container 1000 is pushed to the shelf with the loader 0308 while moving. In the end position electromagnet is applied and pulling the box begins.

The terminal has been set to multi-load function to allow loading several compartments 1002 of one parcel container 1000 of the self-service parcel terminal. Parcel container 1000 is not automatically transported to the shelf after inserting the parcel into the compartment 1002, the next vacant compartment 1002 is opened in the parcel container 1000 instead. In order to do that, the vertical door panel 0406 is closed and the parcel container is then moved away from the seals of the horizontal doors 0405. Horizontal doors 0405 are guided into a new position and the parcel container is again guided against the door seal upon the readiness signal. Vertical door panel 0406 opens. Exchange of parcel container 1000 is carried out when the parcel container has been filled or when the next parcel has been meant for another type of parcel container.

Opening and closing the door panels 0405 and 0406 of the self-service parcel terminal has been divided into three stages. The first and last stages involve opening and closing door panels. Door panels do not move in the second stage. LED lights inside the door system are flashing during the movement of door panels. If the safety curtain was to be interrupted in these stages then the movement of door panels is stopped, and movement resumes when the safety curtain has been released.

Safety curtain is in automatic reset mode in the second stage of opening door panels, after cancelling the motor movement command from the display, or after a longer interruption to the safety curtain according to the time counted by the controller how long the object is in contact with the safety curtain. When this contact time with the object exceeds the determined time x, it is presumed that procedures with the parcel have been finished and the door system may close.

In the case when the parcel is retrieved in the first stage of opening the door system and the person retrieving it leaves, then the vertical door panel 0406 closes automatically and an error message is created for checking the status of the parcel container before using the terminal again. When the retrieval of the parcel fails, the door will be opened again with the same access code or the retrieval time is extended at the user interface.

Upon closing the door system the turning moment of the motor is checked by converter, and compared to the target figure. When the turning moment is higher, the vertical door panel 0406 is moved again to its previous position.

In order to weigh the parcel (for example, to avoid overload in the terminal; calculate the cost of the parcel, or for similar purposes) the turning moment that is influenced by the weight of the parcel container and of the parcels placed inside it, is checked in real time.

Drawings FIG. 21 to FIG. 25 show different examples of using the self-service parcel terminal according to the processes shown in the drawing FIG. 19.

Figure 21:
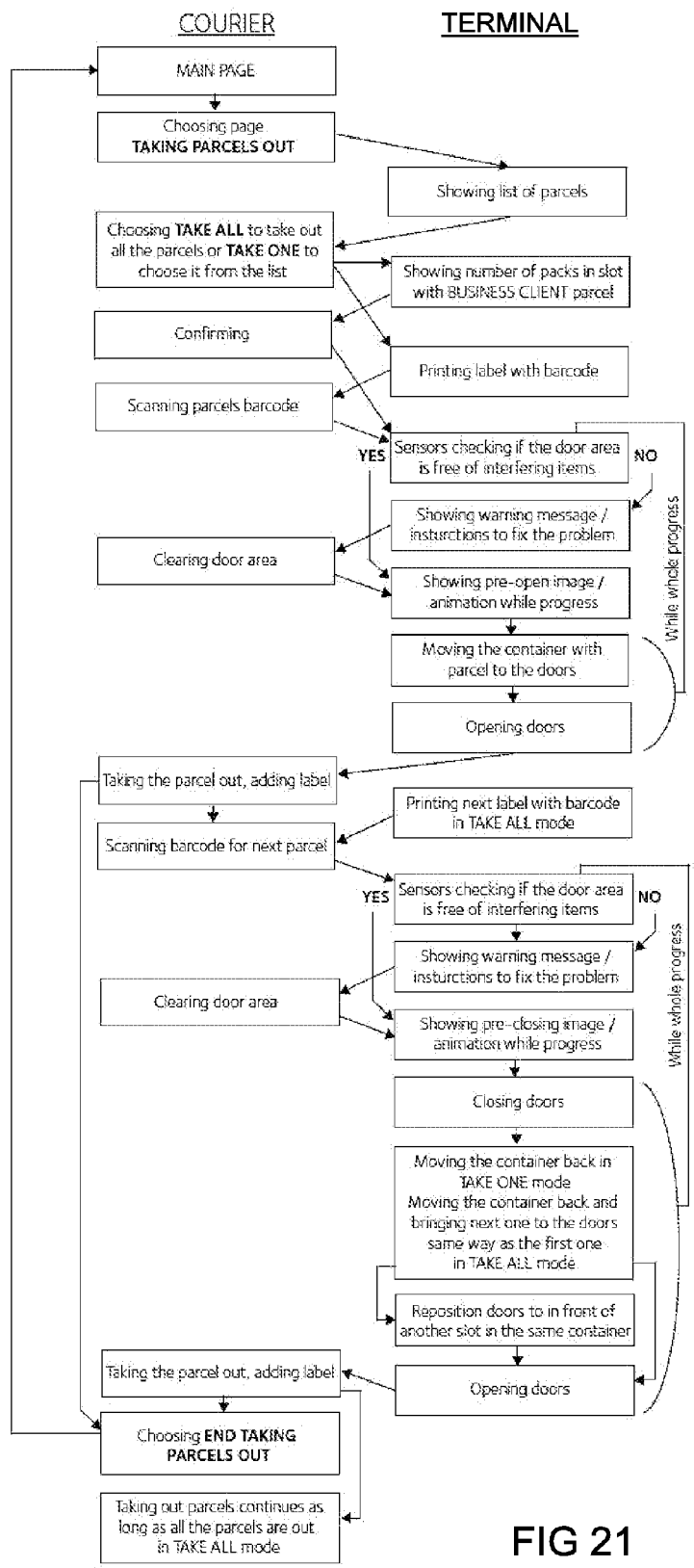
FIG. 21-FIG. 25 show different examples of using the self-service parcel terminal.

FIG. 21 Describes A COURIER TAKING PARCELS OUT

On the main page at the display the courier chooses page TAKING PARCELS OUT and the system shows the list of parcels. Courier chooses TAKE ALL to take out all the parcels or TAKE ONE to choose it from the list and the system shows the number of parcels in slot with BUSINESS CLIENT parcel. Courier confirms and system prints labels with barcode. Courier scans the printed barcodes of the parcels.

At the same time the sensors check if the door area is free from interfering items. If the door area is free, the system shows a pre-opening image and/or animation while in progress. If the door area is not free, the system shows a warning message and/or instructions how to fix the problem. If necessary the courier clears the door area.

The system moves the container with parcels to the doors and opens the doors.

The courier takes parcels out and the system prints the next label with a barcode in TAKE ALL mode. Courier scans the barcode for the next parcel.

At the same time the sensors check if the door area is free from interfering items. If the door area is free, the system shows a pre-closing image and/or animation while in progress. If the door area is not free, the system shows a warning message and/or instructions how to fix the problem. If necessary the courier clears the door area. The system closes the door and moves the container back in TAKE ONE mode. System moves the container back and brings the next one to the doors the same way as the first one in TAKE ALL mode and repositions doors to the front of another slot in the same container and opens the doors.

Courier takes parcels out and chooses END TAKING. Taking out parcels continues as long as all the parcels are out in TAKE ALL mode.

Figure 22:
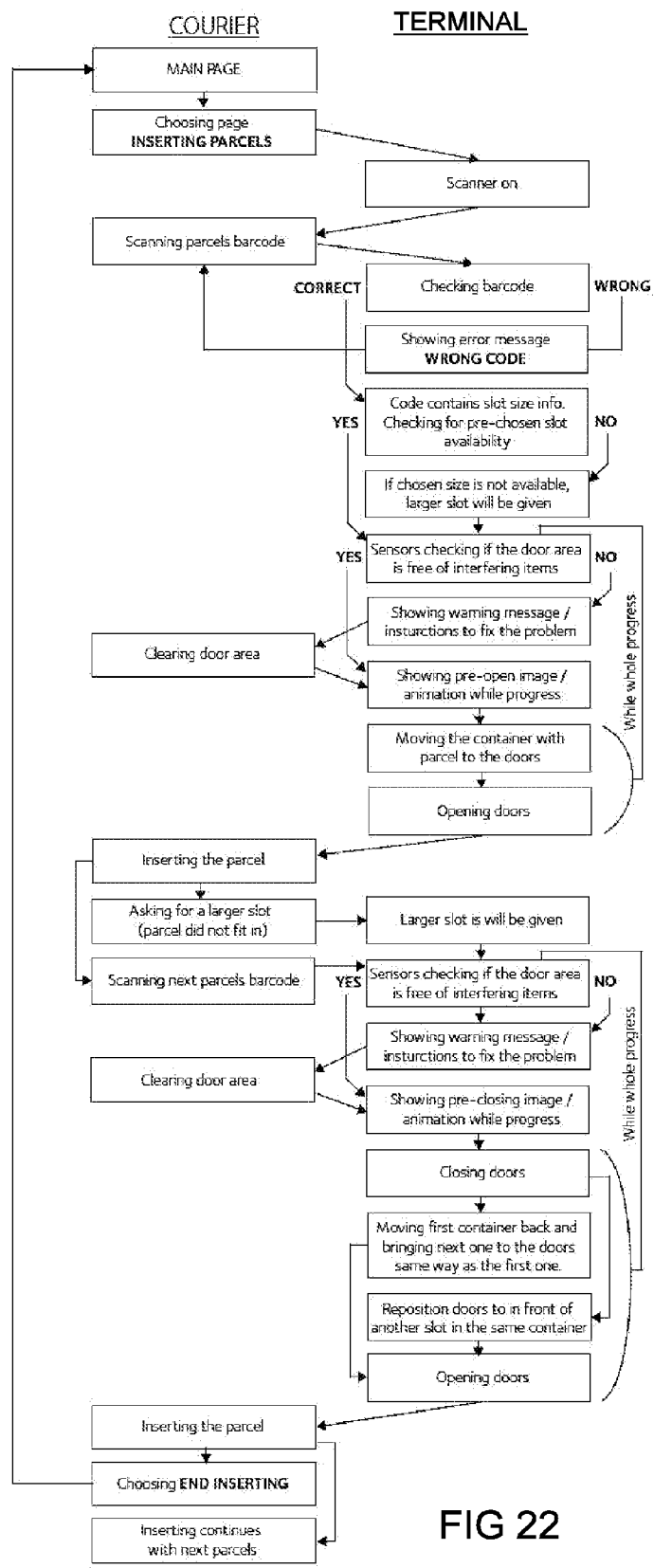

FIG. 22 Describes A COURIER INSRTING PARCELS

On the main page at the display the courier chooses the page INSERTING PARCELS. The system turns the scanner on, the courier scans the barcode of parcels and system checks the barcode. If the barcode is not correct the system displays an error message.

If the barcode is correct the code comprises slot size information and the system checks for pre-selected slot availability. If the selected size is not available, a larger slot will be given.

At the same time sensors check if the door area is free from interfering items. If the door area is free the system displays a pre-opening image/animation while in progress. If the door area is not free the system displays a warning message and/or instructions how to fix the problem and the courier fixes the problem. The system moves the container with the parcel to the doors and opens the doors.

Courier inserts the parcels and if the parcels did not fit in, asks for a larger slot. If the courier has asked for a larger slot, the larger slot will be given by the system.

Courier scans the barcode of the next parcel. At the same time sensors are checking if the door area is free from interfering items. If the door area is free the system displays a pre-closing image and/or animation while progress. If the door area is not free the system displays a warning message and/or instructions to fix the problem and the courier fixes the problem.

System closes the doors, moves the first container back and brings the next one to the doors the same way as the first one and repositions doors to the front of another slot in the same container and opens the doors.

Courier inserts the parcels and chooses END INSERTING on display screen. Inserting continues with next parcels.

Figure 23:
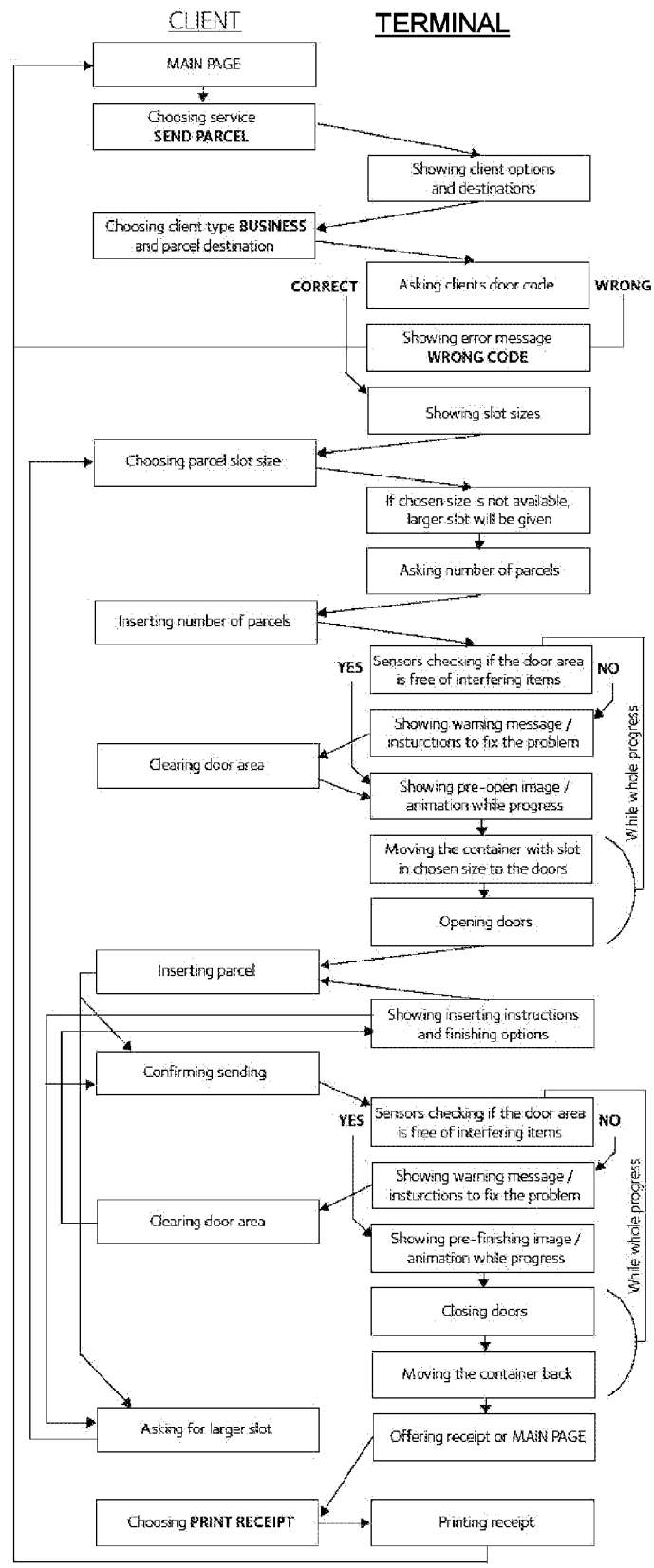

FIG. 23 Describes SENDING A PARCEL—CUSTOMER TO CUSTOMER

On the main page at the display customer selects service SEND PARCEL. The system shows options and destinations. Customer selects type BUSINESS and parcel destination. System asks for customer's door code. If the customer has inserted a wrong code, the system displays an error message. If the door code is correct, the system displays possible slot sizes.

The customer selects the parcel slot size or asks for a larger slot. If the chosen size is not available, a larger slot will be given. The system asks for the number of parcels and the customer inserts the number of parcels. At the same time sensors check if the door area is free from interfering items. If the door area is free the system displays pre-open image/animation while progress. If the door area is not free the system displays a warning message and/or instructions how to fix the problem and the customer fixes the problem. The system moves the container with the slot of selected size to the door, opens the door and shows the inserting instructions and finishing options.

If the slot is in the right size, customer inserts the parcel and confirms sending. If the size of the slot is not correct, customer asks for a larger slot. At the same time sensors are checking if the door area is free from interfering items. If the door area is free the system displays a pre-finishing image/animation while in progress. If the door area is not free the system displays a warning message and/or instructions how to fix the problem and the customer fixes the problem. The system closes the doors, moves the container back and offers a receipt or MAIN PAGE. Customer chooses PRINT RECEIPT and the system prints the receipt.

Figure 24:
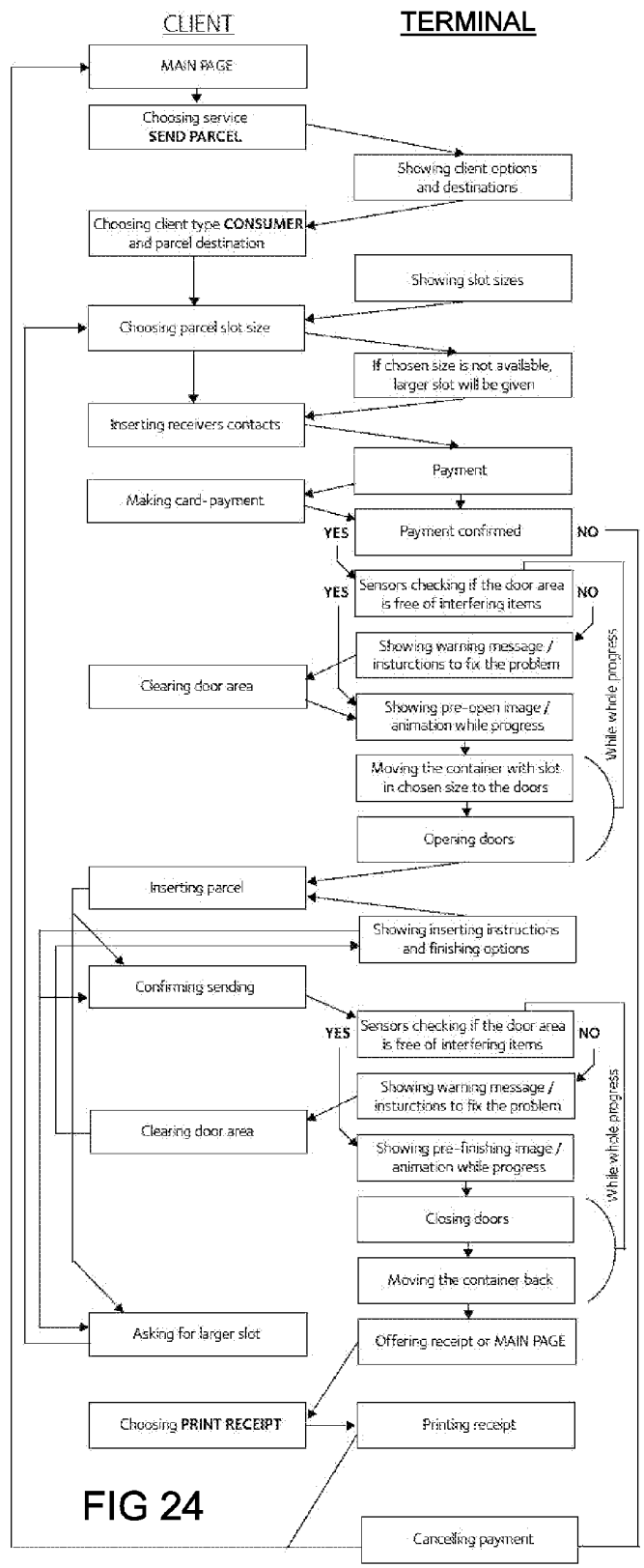

FIG. 24 Describes SENDING PARCEL—CUSTOMER

On the display the customer selects SEND PARCEL. The system shows options and destinations. Customer selects type CONSUMER and parcel destination. System shows possible slot sizes. Client chooses the parcel slot size or asks for a larger slot. If the chosen size is not available, a larger slot will be given. Customer then inserts contacts of the recipient contacts and the system displays the payment menu. Customer makes the payment. If the payment fails, system cancels the payment and displays the main page. If the payment is successful, system confirms the payment.

At the same time sensors check if the door area is free of interfering items. If the door area is free the system displays pre-open image/animation while progress. If the door area is not free the system displays warning message and/or instructions to fix the problem and client fixes the problem. The system moves the container with the slot of selected size to the doors, opens the doors and shows the inserting instructions and finishing options.

If the slot is in the right size, customer inserts the parcel and confirms sending. If the size of the slot is not correct, customer asks for a larger slot. At the same time sensors are checking if the door area is free from interfering items. If the door area is free the system displays a pre-finishing image/animation while in progress. If the door area is not free the system displays a warning message and/or instructions how to fix the problem and the customer fixes the problem. System closes the doors, moves the container back and offers a receipt or MAIN PAGE. Client chooses PRINT RECEIPT and the system prints the receipt.

Figure 25:
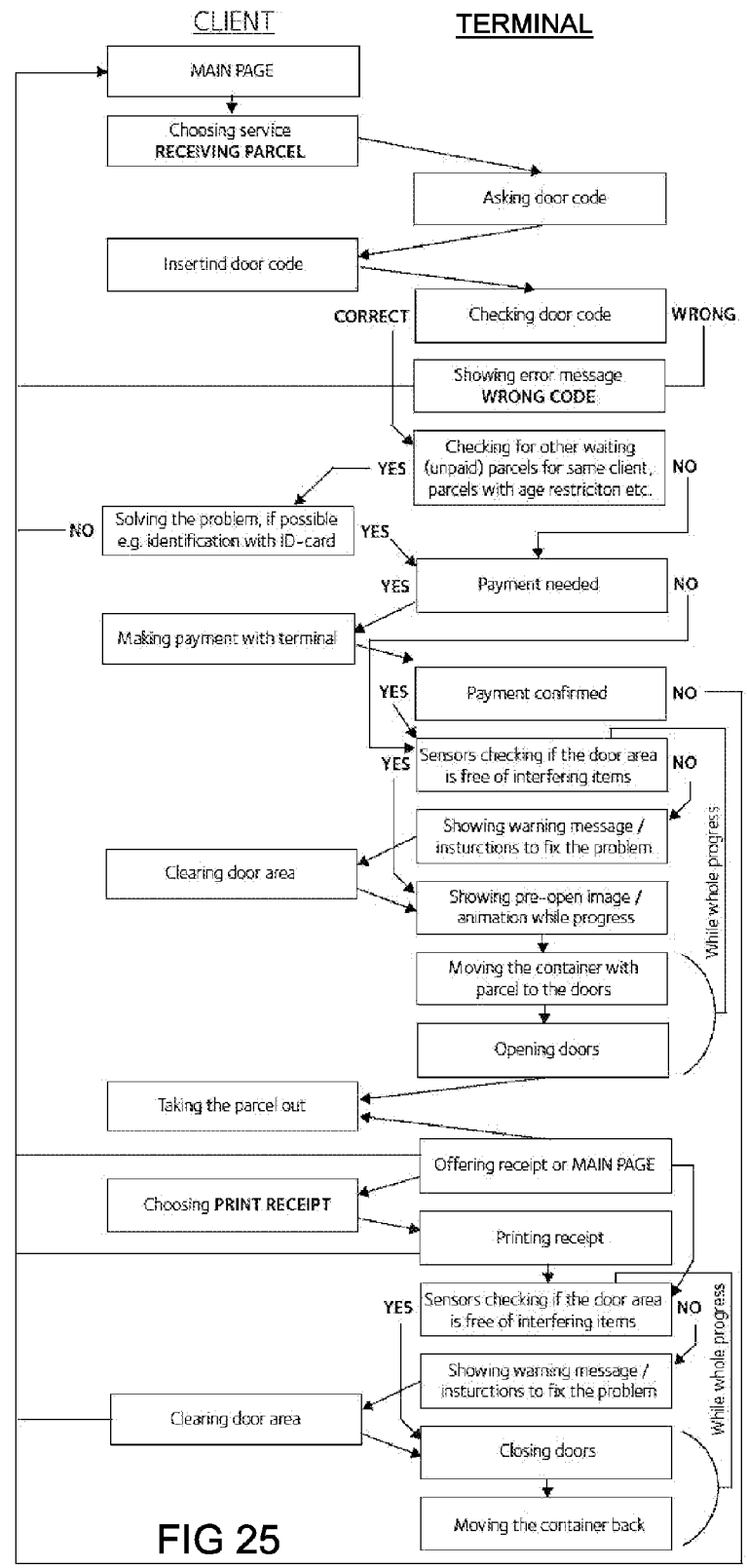

FIG. 25 Describes RECEIVING PARCEL

On the main page at the display the customer selects RECEIVING PARCEL. System asks for the customer door code, customer inserts the door code. System checks the door code, if the customer has inserted a wrong code, system displays an error message. If the inserted door code is correct, system checks for other waiting (unpaid) parcels for the same customer, or parcels with limitations (for example parcels with age restrictions, etc.). If necessary, the customer inserts their ID for identification. System checks whether the payment is needed or not. If the payment is needed, customer makes the payment. If the payment fails, the system cancels the payment and displays the main page. If the payment is successful, system confirms the payment.

At the same time sensors check if the door area is free from interfering items. If the door area is free the system displays a pre-open image/animation while in progress. If the door area is not free the system displays a warning message and/or instructions how to fix the problem and the customer fixes the problem. The system moves the container with the parcel to the doors and opens the doors. Customer takes the parcel out.

System offers a receipt or MAIN PAGE. Client chooses PRINT RECEIPT and the system prints the receipt.

At the same time sensors are checking if the door area is free from interfering items. If the door area is free the system closes the doors and moves the container back. If the door area is not free the system displays a warning message and/or instructions how to fix the problem and the customer fixes the problem, system closes the doors and moves the container back.

LIST OF COMPONENTS 0100 body
0101 removable first upper covering panels
0102 middle covering panel
0103 lower covering panel
0104 two upper side covering panels
0105 two lower side covering panels
0106 belt
0107 sheltering roof
0108 device box
0109 rear covering panel (rear wall)
0200 frame
0201 base frame
0202 support poles
0203 bracket
0204 connecting buses for support poles 0202
0205 roof
0206 support rods for connecting support poles
0207 support rods for connecting support poles
0208 cross poles
0209 rollers
0210 slots of the base frame 0201
0211 absorbers
0300 lift module
0301 energy chain
0302 main boom
0303 belt
0304 counterweight
0305 carriage
0306 magnetic mechanism
0307 positioner
0308 loader
0309 tension adjuster of the belt 0303
0310 connecting plate of the main boom
0311 connecting plate of the carriage
0312 side support
0313 supplementary plate of the side support
0314 supplementary support to the side support
0315 carriage rollers
0316 positioner shoulder
0317 positioner side support
0318 positioner bracket for position rollers
0319 positioner position rollers
0320 positioner motor fastening plate
0323 belt pulley module
0324 pulling module of the main boom
0325 loader frame
0326 loader rollers
0327 positioner rails
0328 pulling belt
0329 the edge restricting uplifting parcel containers
0330 fastening plate of the loader pulling motor
0331 drive wheels
0332 belt fastening plate of the magnetic mechanism
0333 electromagnet
0334 end cover for the stay bolt
0335 tight-fitting bolt of the electromagnet
0336 sensor stay bolt
0337 centering spring for the sensor stay bolt
0338 support frame
0339 guides
0340 chain
0341 levers
0342 gear wheels
0343 transmission chain
0344 link
0345 roller
0346 support plate for the guide
0347 rollers
0400 door system
0401 door system frame
0402 upper slider
0403 rail
0404 lower slider
0405 horizontal door panels
0406 vertical door panel
0407 trapezoid 0408 door system panel
0409 design stripe
0500 payment module
0501 camera
0502 scanner
0503 label printer
0504 receipt printer
0505 payment terminal
0506 switch
0507 router
0508 UPS
0509 3D measuring device
0510 WAN
0600 computer
0601 display/user interface
0701 vertical door motor
0702 left horizontal door motor
0703 right horizontal door motor
0704 main boom motor
0705 positioner motor
0706 loader motor
0800 drive module
0801 vertical door converter (drive)
0802 left horizontal door converter
0803 right horizontal door motor
0804 main boom converter
0805 positioner converter
0806 loader converter
0811 vertical door sensor (home sensor)
0812 left horizontal door sensor
0813 right horizontal door sensor
0814 main boom sensor
0815 positioner sensor
0816 loader sensor
0821 brake resistor
0831 limit switches
0900 electricity module/power supply, input/output devices and safety module
0901 safety curtain (emergency stop)
0903 electromagnetic guide
0904 parcel container distance sensor
0905 door lighting
0906 temperature adjuster
0907 electromagnetic lock of the payment solution
1000 parcel container
1001 locking mechanism
1002 compartment
1003 groove
1100 CPU

What is claimed is:

1. A self-service parcel terminal comprising:
a body;
a frame forming a shelving system for parcel containers, said containers having a multitude of storage slots for storing a multitude of parcels;
a lift module; and
a gripping mechanism;
   the body comprising front covering panels, rear covering panels, and side covering panels;
      the front covering panels forming a slot for a door module to receive and load one or more parcels into a parcel container; a payment module; a computer module, and a user interface;
      the door module further having a frame, two horizontally slidably opening door panels and one vertically slidably opening door panel;
   the frame forming the shelving system being located inside the body and comprising a base frame, a roof and at least eight vertical support poles having two ends and being attached to the base frame from one end and to the roof from the other end;
      four of said support poles being attached to each other with horizontal buses to form a shelf tower, and four poles attached to each other with horizontal buses to form another shelf tower, and the two shelf towers being attached together with multiple brackets to form the shelving system with a space between the shelf towers for the lift module;
   the lift module comprising a pulley module, a main boom and a carriage connected to a positioner;
      the main boom having a lower end and an upper end and the pulley module being fastened to the upper end of the main boom and a pulling module being attached to the lower end of the main boom, a belt being fitted on a belt pulley and the pulling module, a counter weight being fastened to the belt and the carriage is moving up and down with rollers along the main boom upon operation of the motor; and
   the gripping mechanism comprising a loader and a magnetic mechanism,
      the loader comprising a frame, a pulling belt and being attached on top of the positioner in a manner that it can move sideways to left and right and being capable of receiving a parcel container, and
      the magnetic mechanism comprising a covered sensor stay bolt, and an electromagnet; said magnetic mechanism being capable of attaching to the parcel container and enabling pulling a parcel container onto the loader, or pushing the container onto a shelf, and said magnetic mechanism further providing feedback of distance of a parcel container loaded on the loader;
wherein upon initiation of a loading or receiving service at the user interface a user receives or loads the parcels at the door module into or from a parcel container that has been delivered to the door module by the lift module.

2. The terminal according to claim 1, wherein the system comprises an automated system to measure the parcels before loading in, and based on the obtained measures the system delivers a parcel container with measurements suitable for the measured parcels at the door module.

3. The terminal according to claim 2, wherein the two horizontally moving door panels and the one vertically moving door panel comprise sensors to measure the parcel when inserted between open door panels.

4. The terminal according to claim 2, wherein the horizontal and vertical doors may open to expose one slot or several slots on the parcel container and thereby the user may insert or receive one or several parcels at a time.

5. The terminal according to claim 1, wherein the base frame comprises slots on its front vertical side for allowing easy transportation of the frame without a need to disassemble the frame.

6. The terminal according to claim 1, wherein the base frame comprises absorbers on its inner horizontal side for guiding the positioner at its lowest position.

7. The terminal according to claim 1, wherein the carriage comprises two connecting plates attached to two L-shaped side supports and to a supplementary support to attach the positioner.

8. The terminal according to claim 7, wherein the positioner comprises two shoulders having two ends and being attached to the carriage from one end and a bracket attached to the other ends of the shoulders and rollers fastened to each end of the bracket.

9. The terminal according to claim 1, wherein the parcels are being stored in parcel containers having a multitude of storage slots and located on shelves inside the terminal body.

10. The terminal according to claim 1, wherein the terminal additionally comprises a facial recognition camera for identification of the user.

* * * * *